US011462910B2

(12) United States Patent
Lui

(10) Patent No.: US 11,462,910 B2
(45) Date of Patent: Oct. 4, 2022

(54) UTILITY POWER DISTRIBUTION BRANCH MANAGEMENT SYSTEM

(71) Applicant: Cheuk Kwan Lui, Burnaby (CA)

(72) Inventor: Cheuk Kwan Lui, Burnaby (CA)

(*) Notice: Subject to any disclaimer, the term of this patent is extended or adjusted under 35 U.S.C. 154(b) by 191 days.

(21) Appl. No.: 16/647,504

(22) PCT Filed: Sep. 14, 2018

(86) PCT No.: PCT/CA2018/051145
§ 371 (c)(1),
(2) Date: Mar. 15, 2020

(87) PCT Pub. No.: WO2019/051607
PCT Pub. Date: Mar. 21, 2019

(65) Prior Publication Data
US 2020/0220352 A1 Jul. 9, 2020

Related U.S. Application Data

(60) Provisional application No. 62/559,326, filed on Sep. 15, 2017.

(51) Int. Cl.
*H02J 3/14* (2006.01)
*H02J 13/00* (2006.01)
(Continued)

(52) U.S. Cl.
CPC ............. *H02J 3/14* (2013.01); *G05B 19/042* (2013.01); *H02J 13/00007* (2020.01); *H04B 3/54* (2013.01); *G05B 2219/2642* (2013.01)

(58) Field of Classification Search
CPC .... H02J 3/14; H02J 13/00007; G05B 19/042; G05B 2219/2642; H04B 3/54
See application file for complete search history.

(56) References Cited

U.S. PATENT DOCUMENTS

| 4,915,639 A | 4/1990 | Cohn et al. |
| 5,729,733 A | 3/1998 | Sharif-Askary |

(Continued)

FOREIGN PATENT DOCUMENTS

| DE | 102014013111 | 3/2016 |
| EP | 0704952 | 9/1999 |

(Continued)

OTHER PUBLICATIONS

Distributed database, Wikipedia, pp. 1 to 5, https://en.wikipedia.org/wiki/Distributed_database, from the WayBackMachine(TM), archived page dated Jan. 27, 2016.

(Continued)

*Primary Examiner* — Thomas C Lee
*Assistant Examiner* — Ameir Myers
(74) *Attorney, Agent, or Firm* — Nicholas Garner; Oyen Wiggs Green & Mutala LLP

(57) ABSTRACT

There is provided a system for assigning power to a plurality of smart appliances. The system includes a plurality of smart outlet assemblies. Each of the smart outlet assemblies is paired to and in electrical communication with a respective one of the smart appliances. The system includes at least one smart breaker assembly in electrical communication with the smart outlet assemblies. The system includes a master server in communication with the smart breaker assembly. The system includes distributed databases used to exchange data among the smart outlet assemblies, the smart breaker assembly, and the master server. The master server selectively assign power to respective ones of the smart appliances via the smart breaker assembly based on the data. If the master server is unreachable, the smart breaker assembly is configured to selectively assign power to the smart appliances based on the data records.

23 Claims, 29 Drawing Sheets

(51) Int. Cl.
 *G05B 19/042* (2006.01)
 *H04B 3/54* (2006.01)

(56) References Cited

U.S. PATENT DOCUMENTS

| | | | |
|---|---|---|---|
| 5,844,326 | A | 12/1998 | Proctor et al. |
| 5,946,180 | A | 8/1999 | Simpson |
| 6,046,513 | A | 4/2000 | Jouper et al. |
| 6,049,143 | A | 4/2000 | Simpson et al. |
| 7,280,931 | B1 | 10/2007 | Kim et al. |
| 7,333,000 | B2 | 2/2008 | Vassallo |
| 7,657,763 | B2 | 2/2010 | Nelson et al. |
| 8,674,556 | B2 | 3/2014 | Tinaphong et al. |
| 8,683,236 | B2 | 3/2014 | Ukita et al. |
| 8,785,773 | B1 | 7/2014 | Lanni |
| 8,818,532 | B1 | 8/2014 | Vasquez |
| 9,013,283 | B1 | 4/2015 | Tackaberry |
| 9,021,044 | B2 | 4/2015 | Blustein et al. |
| 9,118,218 | B2 | 8/2015 | Park et al. |
| 9,231,353 | B2 | 1/2016 | Lee |
| 9,235,247 | B2 | 1/2016 | Chan |
| 9,270,116 | B2 | 2/2016 | Adams |
| 9,465,819 | B2 | 10/2016 | Bartolomé Rodrigo |
| 9,577,432 | B2 | 2/2017 | Li |
| 2005/0146219 | A1 | 7/2005 | Pincu et al. |
| 2008/0221737 | A1 | 9/2008 | Josephson et al. |
| 2009/0198385 | A1 | 8/2009 | Oe et al. |
| 2010/0145542 | A1 | 6/2010 | Chapel et al. |
| 2010/0280674 | A1 | 11/2010 | Jalili |
| 2011/0015795 | A1 | 1/2011 | Boyer et al. |
| 2013/0097070 | A1 | 4/2013 | Baker |
| 2013/0245849 | A1* | 9/2013 | Paul ............ G05B 15/02 700/295 |
| 2015/0255932 | A1* | 9/2015 | Dicks ............ H01R 13/6666 307/326 |
| 2016/0126783 | A1 | 5/2016 | Cheng et al. |
| 2016/0224083 | A1* | 8/2016 | Dent ............ G06F 1/266 |
| 2017/0070090 | A1 | 3/2017 | Miller |
| 2017/0256941 | A1* | 9/2017 | Bowers ............ H02J 13/0006 |
| 2018/0301900 | A1* | 10/2018 | Geng ............ H02J 3/14 |

FOREIGN PATENT DOCUMENTS

| | | |
|---|---|---|
| EP | 2873130 A1 | 5/2015 |
| JP | 2001339876 | 12/2001 |
| WO | 2002071573 | 9/2002 |
| WO | 2004036399 | 4/2004 |
| WO | 2005043712 | 5/2005 |
| WO | 2013059221 | 4/2013 |

OTHER PUBLICATIONS

Star network, Wikipedia, pp. 1 to 2, https://en.wikipedia.org/wiki/Star_network, from the WayBackMachine(TM), archived page dated Nov. 25, 2015.

* cited by examiner

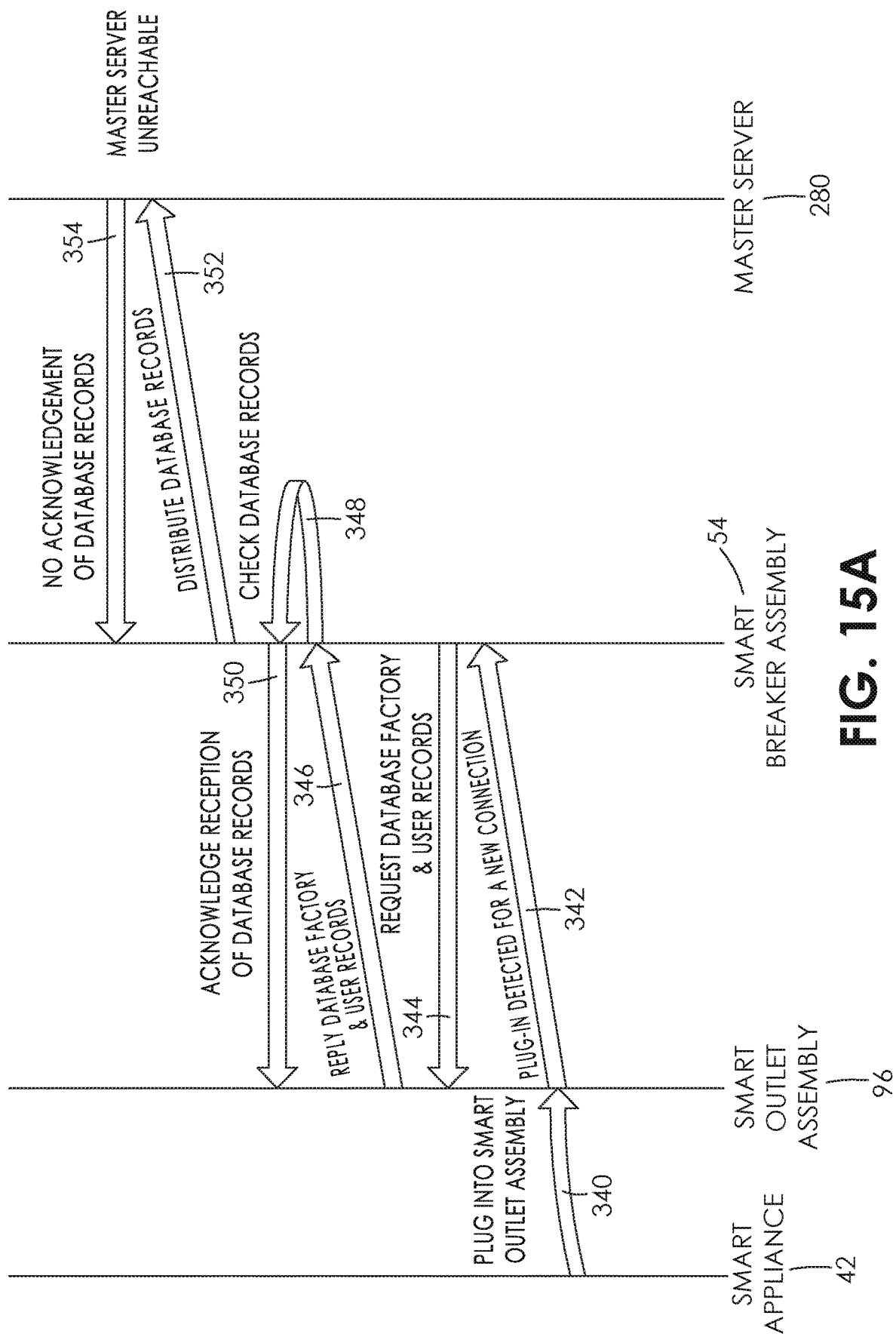

UTILITY POWER DISTRIBUTION BRANCH MANAGEMENT SYSTEM

CROSS REFERENCE TO RELATED APPLICATIONS

This application is a non-provisional of U.S. Provisional Patent Application No. 62/559,326 filed in the United States Patent and Trademark Office on Sep. 15, 2017, and the disclosure of which is incorporated herein by reference and priority to which is claimed.

BACKGROUND OF THE INVENTION

Field of the Invention

There is provided a branch management system. In particular, there is provided a utility power distribution branch management system.

Description of the Related Art

U.S. Pat. No. 6,046,513 to Jouper et al. discloses apparatus for and method of managing and distributing power from a supply of limited power. A plurality of outlets are connect to a plurality of power units. As additional outlets are used, the invention measures the amount of power drawn by the outlets. Outlets are enabled if the amount of measured power is less than a maximum amount of power available. Additional outlets not currently in use are disabled if the amount of measured power is greater than the maximum amount of power available.

U.S. Pat. No. 9,577,432 to Li discloses a system including a plurality of smart outlets and a backend system in wireless communication with the smart outlets. The smart outlets are configured to provide electrical power from an electrical system to respective power loads, and configured to measure power consumption characteristics thereof the respective power loads. The power consumption characteristics may include real power, apparent power or a combination thereof consumed by the respective power loads. The backend system may be configured to wirelessly receive the power consumption characteristics from the smart outlets for analysis in accordance with a power distribution schedule of the electrical system, and wirelessly transmit a command signal to one or more of the smart outlets in various instances response to the analysis. This command signal may instruct the respective one or more smart outlets to shed or restore power to respective power loads from the electrical system.

U.S. Pat. No. 9,013,283 to Tackaberry discloses a smart outlet and a smart grid electrical management system. The outlet is adapted to fit in a typical gang box, to swivel, to detect and retain a plug, to automatically respond to a change in electrical demand and to provide a standby mode. The outlet includes a circuit board and an operably coupled touch screen GUI display controller. The management system includes a display controller for receiving user inputs and power data, for controlling the system and for outputting information, a ZigBee enabled load controller and a wired or wireless communication network linking the display controller, the load controller and one or more outlets, power sources, and/or electrical appliances or devices.

U.S. Pat. No. 4,915,639 to Cohn discloses an intelligent AC outlet is adapted to mate with a plug. The plug carries coded information as to the power which it draws. A microprocessor, a switch and a sensor are carried in the outlet. The switch is interposed between the outlet and AC power lines and is operated by the microprocessor. The microprocessor continually scans the sensor. When the plug is inserted into the outlet, the sensor reads the code. If the microprocessor detects a valid code, it operates the switch applying power to the plug. If a valid code is not detected, the outlet remains electrically isolated from the power lines and this cannot be overriden by the user.

BRIEF SUMMARY OF INVENTION

There is provided, and it is an object to provide, an improved utility power distribution branch management system disclosed herein.

According to a first aspect, there is provided a power assignment system for selectively providing power to a plurality of smart appliances. Each of the smart appliances contains a database of manufacturer-provided and user-provided data records stored in memory thereof. The system includes an electrical power source. The system includes a plurality of electrical circuits. Each of the circuits includes a smart breaker assembly coupled to the power source. Each of the circuits includes branches and sub-branches. The appliances couple to respective ones of the sub-branches of the circuits. The system includes a plurality of smart outlet assemblies per respective one of the circuits. The smart outlet assemblies couple to and exchange database records with paired ones of the appliances. Each of the smart outlet assemblies includes stored in memory thereof a collection of database records of all of the appliances that are connected, authorized to connect and pending to connect thereto. The smart outlet assemblies couple to and exchange database records with their corresponding one of the smart breaker assemblies. Each of the smart breaker assemblies includes stored in memory thereof a collection of database records of all the database records stored in their smart outlet assemblies. The system includes a master server in communication and exchanging database records with the smart breaker assemblies. The master server manages power assignments and re-assignments for the circuits including the sub-branches based on the manufacturer-provided and user-provided data records.

According to a second aspect, there is provided a system for assigning power to a plurality of smart appliances. The smart appliances each include manufacturer-provided and user-provided data records. The system includes a plurality of smart outlet assemblies. Each of the smart outlet assemblies is paired to and in electrical communication with a respective one of the smart appliances. The system includes a smart breaker assembly in electrical communication with the smart outlet assemblies. The system includes a master server in communication with the smart breaker assembly. The master server selectively assigns power to respective ones of the smart appliances via the smart breaker assembly and the smart outlet assemblies based on the data records. If the master server is unreachable, the smart breaker assembly is configured to selectively assign power to the smart appliances based on the data records.

According to a third aspect, there is provided a system for assigning power to a plurality of smart appliances. The system includes a plurality of smart outlet assemblies. Each of the smart outlet assemblies is paired to and in electrical communication with a respective one of the smart appliances. The system includes at least one smart breaker assembly in electrical communication with the smart outlet assemblies. The system includes a master server in communication with the smart breaker assembly. The system includes distributed databases used to exchange data among the smart outlet assemblies, the smart breaker assembly, and the master server. The master server selectively assigns power to respective ones of the smart appliances via the smart breaker assembly based on said data. If the master server is unreachable, the smart breaker assembly is configured to selectively assign power to the smart appliances based on the data records.

According to a fourth aspect, there is provided a branch management system for managing electrical power distribution. The system includes a plurality of electrical circuits, each comprising branches and sub-branches. The system includes a plurality of smart appliances associated with respective ones of the sub-branches. Each of the smart appliances includes a communication unit, memory, and manufacturer-provided data records and user-provided data records stored within said memory. The system includes a plurality of smart outlet assemblies per circuit. Each of the smart outlet assemblies includes a communication unit, memory, and at least one processor/control-unit. Each of the appliances is paired with and exchanges its manufacturer-provided data records and user-provided data records with a corresponding one of the smart outlet assemblies via the communication units. The processors of the smart outlet assemblies generate system data records based on the manufacturer-provided data records and the user-provided data records. The system data records, the manufacturer-provided data records and the user-provided data records are stored in the memory of the smart outlet assemblies. The system includes a smart breaker assembly comprising a communication unit, memory, and at least one processor. The smart outlet assemblies exchange the system data records, the manufacturer-provided data records and the user-provided data records with the smart breaker assembly via the communication units of the smart outlet assemblies and the smart breaker assembly. The system includes a master server in communication and exchanging database records with the smart breaker assemblies. The master server manages power assignments and re-assignments for the circuits including said branches and said sub-branches based on the manufacturer-provided data records, the user-provided data records and the system records.

According to a fifth aspect, there is provided a method for determining if a smart plug assembly is attached to a smart outlet assembly. The method includes providing the smart outlet assembly with a closed-loop current detection circuit that signals that a plug is connected to the smart outlet assembly when current is detected. The method includes the smart outlet assembly conveying a scanning signal to the smart plug assembly during pairing up of the smart outlet assembly and the smart plug assembly, prior to applying power after said pairing, or prior to re-applying power to the smart plug every time after intentional or unintentional power interruption. The method includes the smart plug assembly conveying a reply signal in response to the scanning signal, whereby the smart outlet assembly determines that the smart plug is connected thereto upon both detecting said current and the replying signal matching a set criteria of the smart outlet assembly.

According to a sixth aspect, there is provided a method of assigning power to an appliance via a smart outlet assembly, a smart breaker assembly and a master server. The method includes using a closed-loop current detection method to determine when the appliance has been plugged into the smart outlet assembly. The method includes, when the current is detected, communicating manufacturer-provided and user-provided data records for the appliance between the smart outlet assembly, the smart breaker assembly and the master server. The method includes automatically assigning power to the appliance based on the data records.

According to a seventh aspect, there is provided a method of assigning power to a plurality of appliances via a plurality of smart outlet assemblies, a smart breaker assembly and a master server. The method includes pairing respective ones of the appliances to respective ones of the smart outlet assemblies. The method includes using a closed-loop current detection method to determine when a given one of the appliance has been plugged into a given one of the smart outlet assemblies. The method includes, when the current is detected, communicating manufacturer-provided and user-provided data records for the given one of the appliances between the smart outlet assemblies, the smart breaker assembly and the master server. The method includes using the data records to determine power availability for the given one of the smart appliances. The method includes automatically assigning power to the appliances based on the data records.

BRIEF DESCRIPTION OF DRAWINGS

The invention will be more readily understood from the following description of preferred embodiments thereof given, by way of example only, with reference to the accompanying drawings, in which:

FIGS. 15A and 15B are schematic diagrams of the power assignment and power re-assignment processes when the master server of FIG. 1 is unreachable;

DESCRIPTION OF THE PREFERRED EMBODIMENTS

Figure 1:
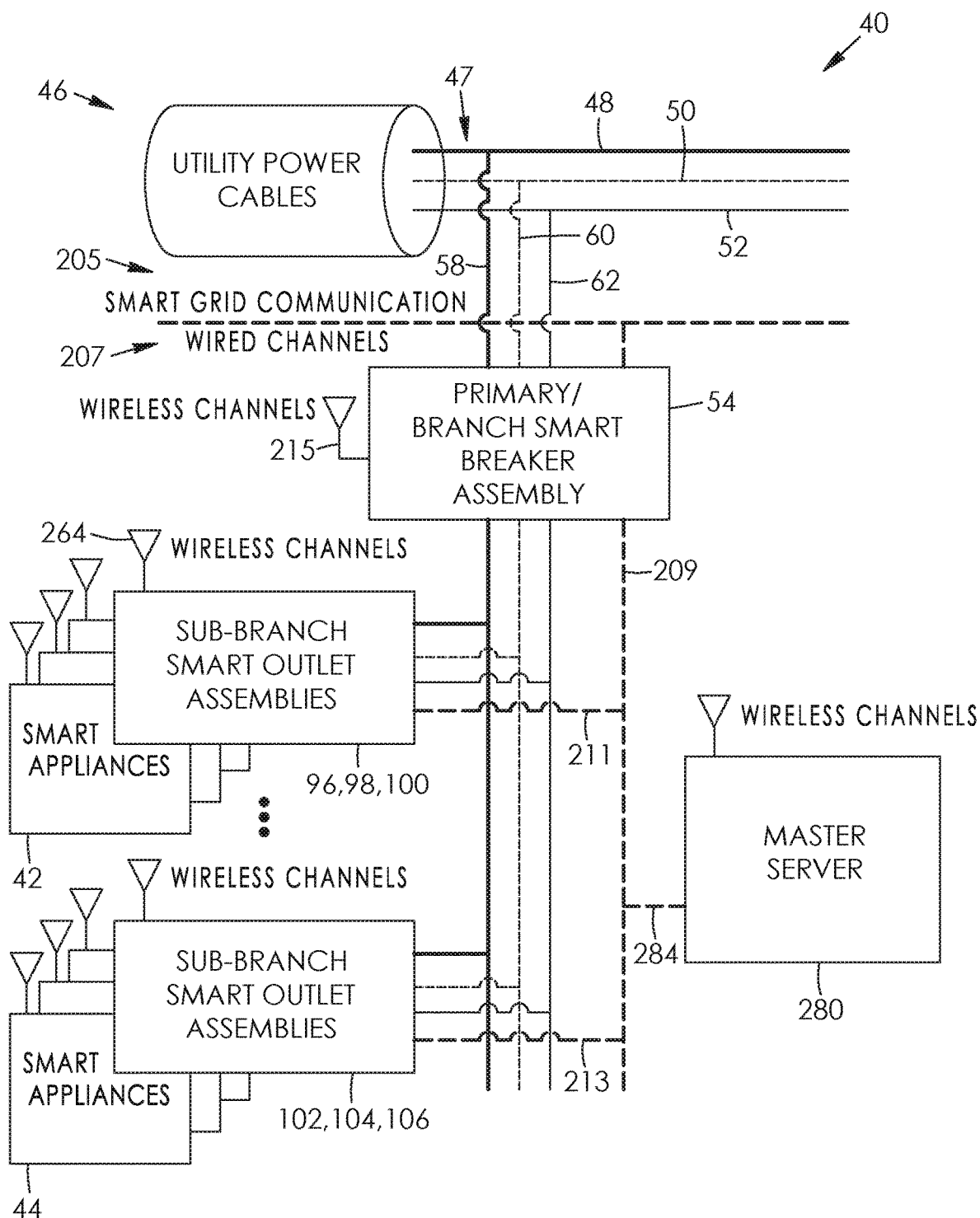
FIG. 1 is a schematic view of a utility power distribution branch management system according to one aspect, the system including a primary smart breaker assembly coupling to utility power cables, a plurality of sub-branch smart outlet assemblies in electrical communication with the primary smart breaker assembly, the sub-branch smart outlet assemblies being paired with smart appliances, and including a master server in electrical communication with the smart breaker assembly.

Referring to the drawings and first to FIG. 1, there is shown a utility power distribution branch management system, in this example a power assignment system 40 for selectively providing power to a plurality of smart appliances, including appliances 42 and 44 shown in FIG. 1. A smart appliance may be defined as an appliance that uses computer and communications technology to share information. A smart appliance may include a built-in web-enabled microprocessor and artificial intelligence applications to optimize the use and energy efficiency thereof.

The system includes an electrical power source 46 through which power is supplied via a utility power cable 47 comprising a hot or live conductor 48, a neutral conductor 50 and a ground conductor 52.

Figure 13:
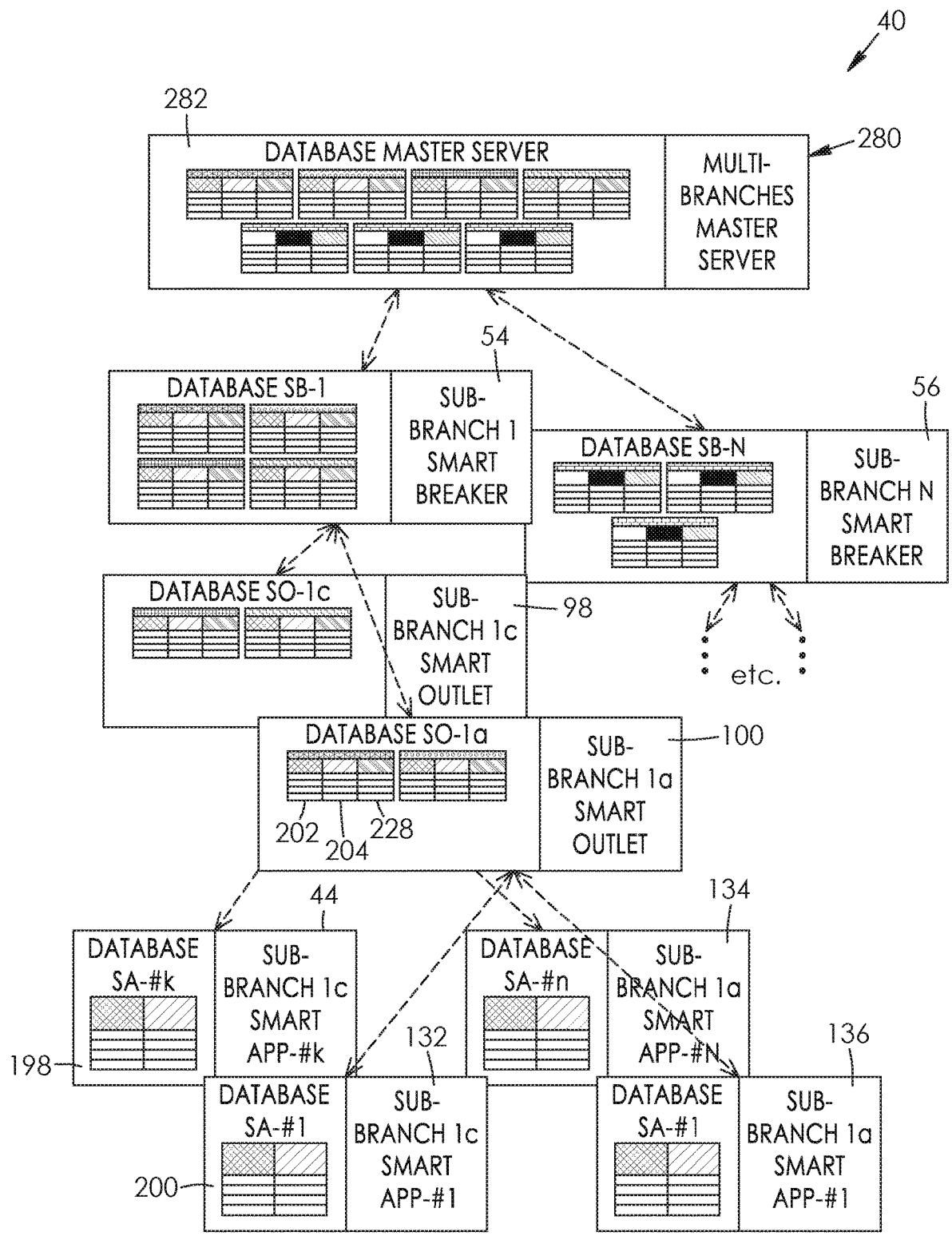
FIG. 13 is a schematic view of the topology of the distributed databases of the system of FIG. 1.

Referring to FIG. 13, the system 40 includes a plurality of primary smart breaker assemblies, as shown by assemblies 54 and 56. Referring back to FIG. 1, each primary smart breaker assembly 54 couples to the power source 46 via a plurality of conductors 58, 60 and 62 which couple to live conductor 48, neutral conductor 50 and ground conductor 52, respectively.

Figure 2:
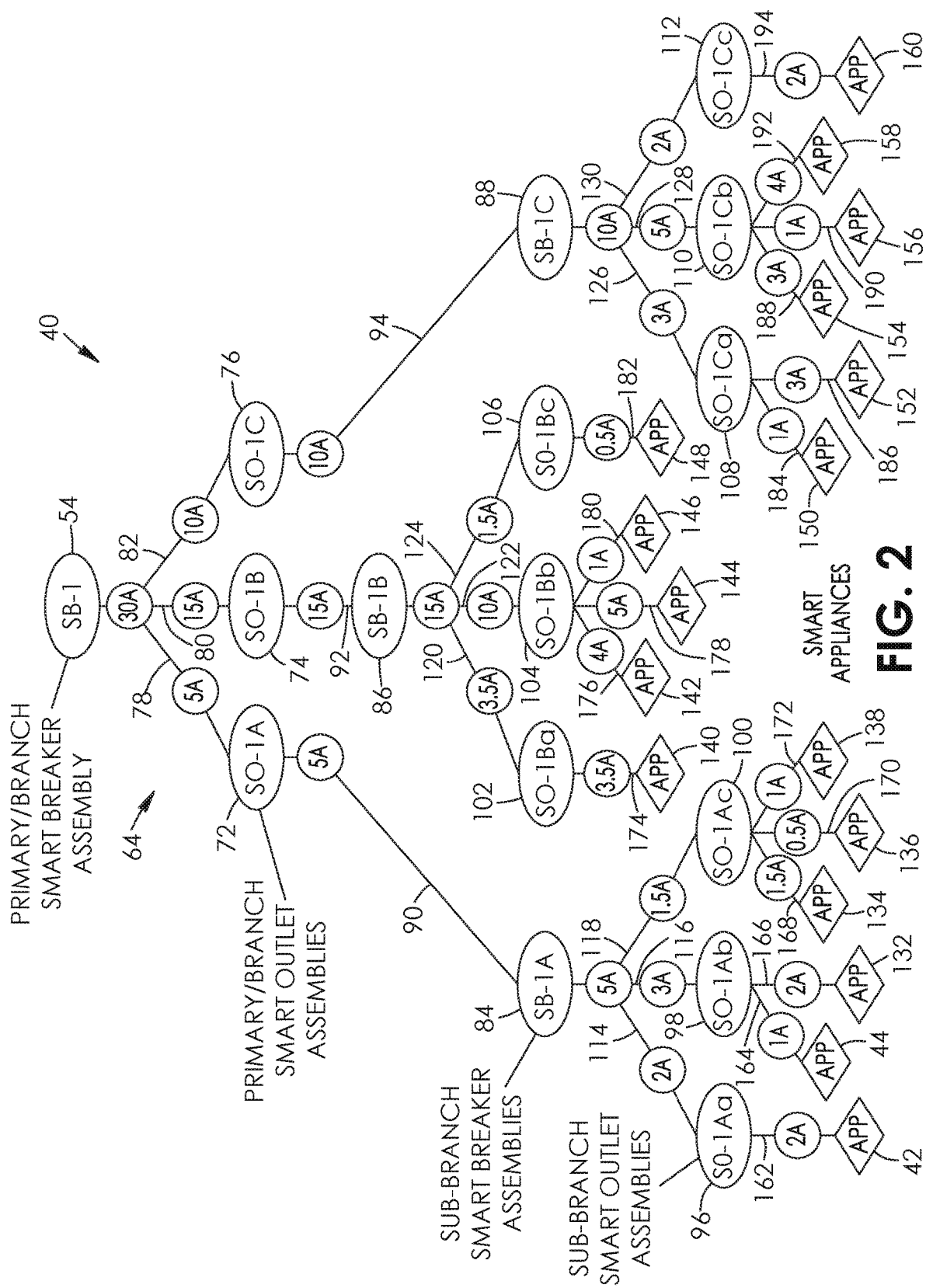
FIG. 2 is a schematic view of the power sharing scheme and topology of the system of FIG. 1, showing the primary smart breaker assembly of FIG. 1, a plurality of primary smart outlet assemblies electrically coupled thereto, a plurality of sub-branch smart-breaker assemblies electrically coupled to respective ones of the primary smart outlet assemblies, the plurality of sets of sub-branch smart outlet assemblies of FIG. 1, with each set of sub-branch smart outlet assemblies electrically coupling to a respective one of the sub-branch smart outlet assemblies, and the plurality of smart appliances of FIG. 1 electrically coupling to respective ones of the sub-branch smart outlet appliances.

Referring to FIG. 2, the system 40 includes a plurality of primary smart outlet assemblies for each primary smart breaker assembly, as shown by primary smart outlet assemblies 72, 74 and 76 coupled to and in electrical communication with primary smart breaker assembly 54 via branch circuits 78, 80 and 82.

The system 40 in this example further includes a plurality of secondary or sub-branch smart breaker assemblies 84, 86 and 88 which couple to and are in electrical communication with the primary smart outlet assemblies 72, 74 and 76, respectively, via conductors 90, 92 and 94.

The system 40 in this example includes a plurality of secondary or sub-branch smart outlet assemblies 96, 98, 100, 102, 104, 106, 108, 110, and 112. Sub-branch smart outlet assemblies 96, 98 and 100 couple to and are in electrical communication with sub-branch smart breaker assembly 84 via sub-branch circuits 114, 116 and 118. Sub-branch smart outlet assemblies 102, 104 and 106 couple to and are in electrical communication with sub-branch smart breaker assembly 86 via sub-branch circuits 120, 122 and 124. Sub-branch smart outlet assemblies 108, 110 and 112 couple to and are in electrical communication with sub-branch smart breaker assembly 88 via sub-branch circuits 126, 128 and 130.

Still referring to FIG. 2, the system 40 includes a plurality of smart appliances 42, 44, 132, 134, 136, 138, 140, 142, 144, 146, 148, 150, 152, 154, 156, 158 and 160. Smart appliance 42 couples to and is in electrical communication with sub-branch smart outlet assembly 96 via conductor 162. Smart appliances 44 and 132 couple to and are in electrical communication with sub-branch smart outlet assembly 98 via conductors 164 and 166. Smart appliances 134, 136 and 138 couple to and are in electrical communication with sub-branch smart outlet assembly 100 via conductors 168, 170 and 172. Smart appliance 140 couples to and is in electrical communication with sub-branch smart outlet assembly 102 via conductor 174. Smart appliances 142, 144 and 146 couple to and are in electrical communication with sub-branch smart outlet assembly 104 via conductors 176, 178 and 180. Smart appliance 148 couples to and is in electrical communication with sub-branch smart outlet assembly 106 via conductor 182. Smart appliances 150 and 152 couple to and are in electrical communication with sub-branch smart outlet assembly 108 via conductors 184 and 186. Smart appliances 154, 156 and 158 couple to and are in electrical communication with sub-branch smart outlet assembly 110 via conductors 188, 190 and 192. Smart appliance 160 couples to and is in electrical communication with sub-branch smart outlet assembly 112 via conductor 194.

Figure 9:
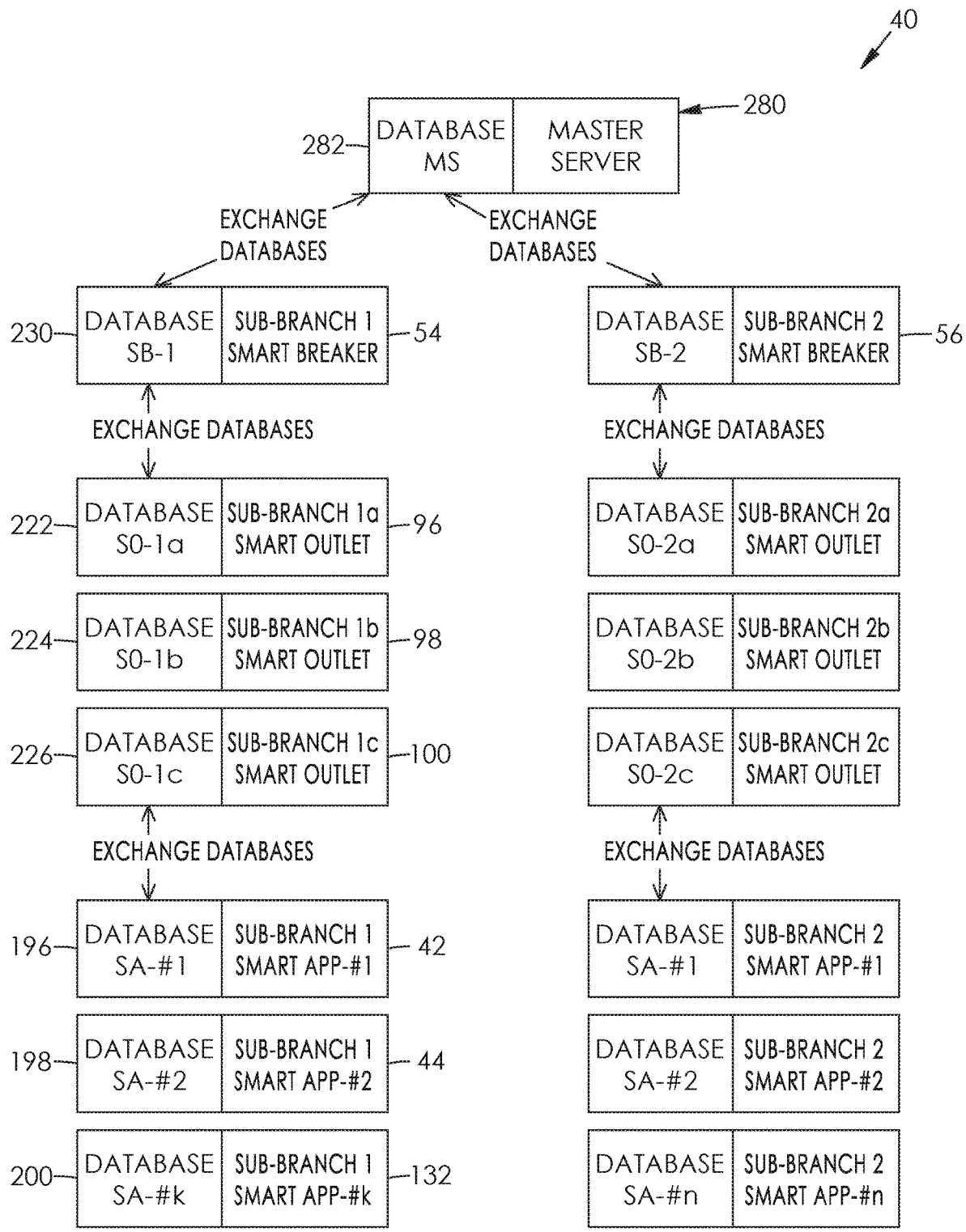
FIG. 9 is a schematic view of distributed databases of the system of FIG. 1.
Figure 12:
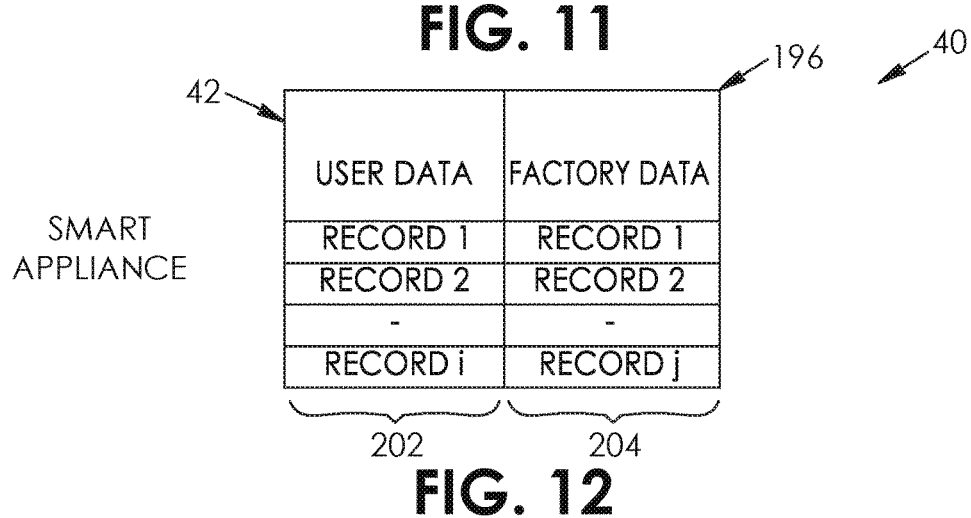
FIG. 12 is a schematic view of the structure of a distributed database of a given one of the smart appliances of FIG. 1.

Each of the smart appliances contains a database, as seen in FIG. 9 by databases 196, 198 and 200 for smart appliances 42, 44 and 132, respectively. Referring to FIG. 12, each database 196 comprises user-provided data records 202 and manufacturer/factory provided data records 204 stored in memory of the smart appliance 42. The manufacturer-provided data records comprise operating profiles of the appliances predefined and programmed by manufacturers thereof. The manufacturer-provided data records 204 include voltage rating, current consumption and cable size information for respective appliances, for example. The records may thus comprise manufacturer-defined power requirements and related information.

Referring to FIG. 12, the user-provided data records 202 comprise operating profiles of the appliances defined and programmed by a user. The user-provided data records include power setting information, on/off timer information, and priority-of-operation information as defined and programmed by the user for each of the appliances, for example. The records 202 may thus comprise user-defined schedules and conditions of operation for a given said smart appliance 42 seen in FIG. 1.

Referring to FIG. 1, the system 40 includes a smart grid communication assembly 205 comprising wired communication channels 207. The smart grid communication assembly includes conductors as schematically shown by conductors 209 and 211 that couple to and enable wired communication between the smart breaker assemblies 54 and smart outlet assemblies 96, 98, 100. The smart grid communication assembly 205 includes conductors as schematically shown by conductors 209 and 213 that couple to and enable wired communication between the smart breaker assemblies and smart outlet assemblies 102, 104 and 106.

Figure 4:
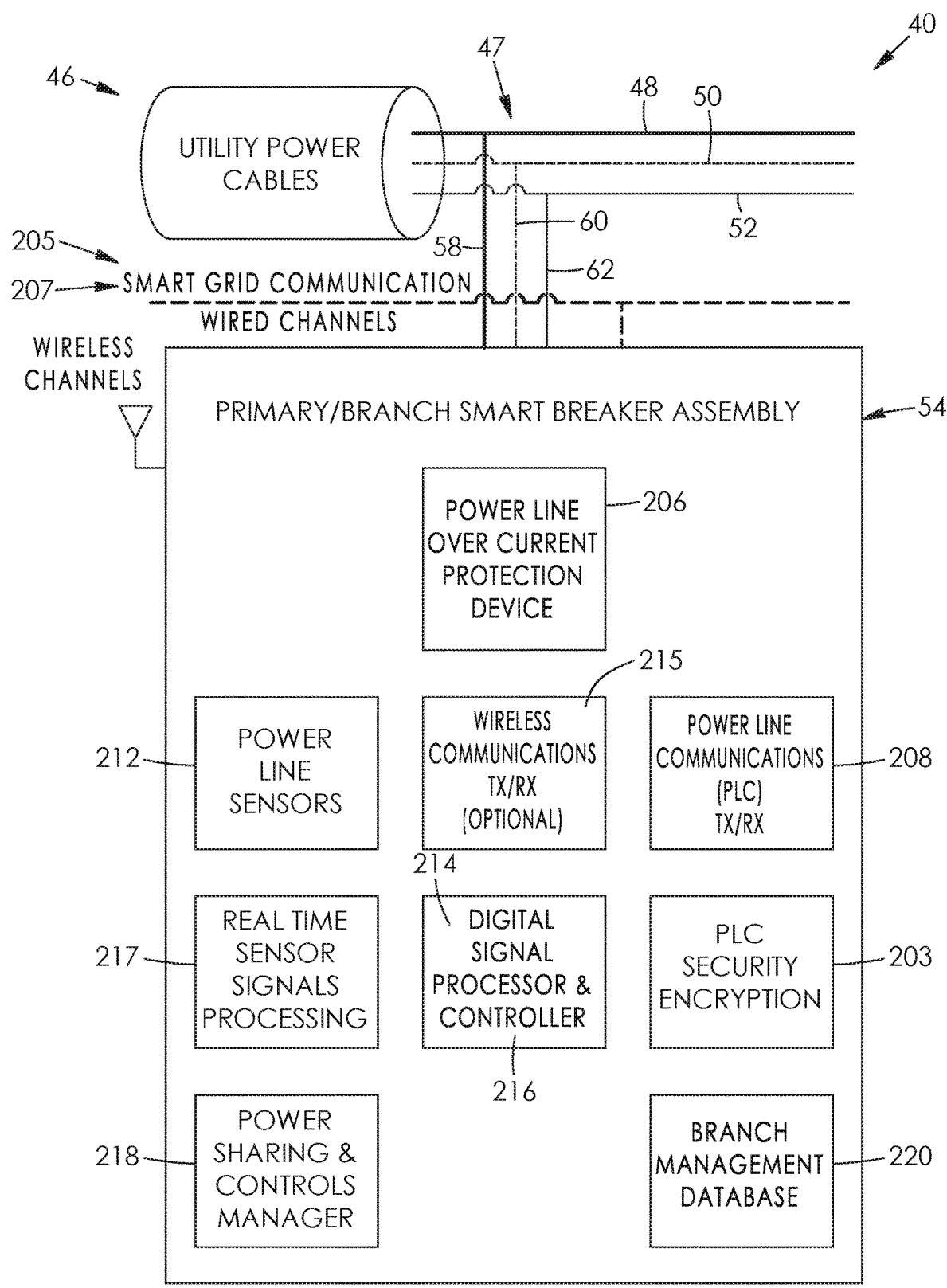
FIG. 4 is a schematic view of the primary smart breaker assembly of FIG. 1, illustrating components thereof.

Referring to FIG. 4, each of the smart breaker assemblies 54 manages safe power usages for its branches and sub-branches. Each of the smart breaker assemblies includes a power line overcurrent protection device 206, such as a circuit breaker for example. Each power line overcurrent protection device functions as an electrical breaker to protect the circuit branch associated therewith from overcurrent loading of branch cables by loads connected to the circuit branch associated therewith and related said sub-branches.

Each of the smart breaker assemblies 54 includes a multi-channel power line communication transceiver 208 with channel encryption 203 for system security. Each multi-channel power line communication transceiver is configured to enable communication between the smart breaker assemblies. This communication is shown between smart breaker assemblies 54 and 56 in FIG. 3 by arrow 210.

Referring back to FIG. 4, the power line communication transceiver 208 may also enable communications between a branch and a smart meter (not shown). Each of the smart breaker assemblies 54 may optionally include a wireless communication transceiver 215 for communications between a branch and the smart meter.

Each smart breaker assembly includes power line sensors 212 which measure voltage, current, power and environmental parameters. Each smart breaker assembly 54 includes at least one digital signal processor 214 which processes real time analog sensing signals from the power line sensors and converts the analog sensing signals to digital signals for storage and real time power sharing. Each smart breaker includes at least one controller 216 which performs computations and directs of the smart breaker assembly. The digital signal processor and controller process real time signals, as shown by box 217, captured by the power line sensors 212. The digital signal processor 214 and controller 216 process power calculations, manage communications, and control powering up and down of the circuit branch and related sub-branches associated therewith.

Still referring to FIG. 4, each of the smart breaker assemblies 54 includes a power sharing and controls manager 218 that manages real time sensor data, real time power sharing among appliances based on the power sharing, and power usage parameters stored in branch databases.

Each of the smart breaker assemblies 54 includes a branch management database 220 that stores power sharing and power usage parameters of each said appliance associated therewith for branch and sub-branch power management. The branch management database further stores environmental parameters and system parameters, including temperature data and cable size requirements, for system management.

Referring to FIG. 2, the sub-branch smart outlet assemblies couple to, are in electrical communication with, and exchange database records with paired ones of the appliances, as shown by sub-branch smart outlet assembly 100 coupled to appliances 134, 136 and 138. The database records and communication channels of the system 40 are encrypted. Referring to FIG. 9, the sub-branch smart outlet assemblies 96, 98, and 100 include stored in memory thereof collections of database records 222, 224 and 226, respectively, of all of the appliances that are connected, authorized to connect and pending to connect thereto in this example.

Figure 10:
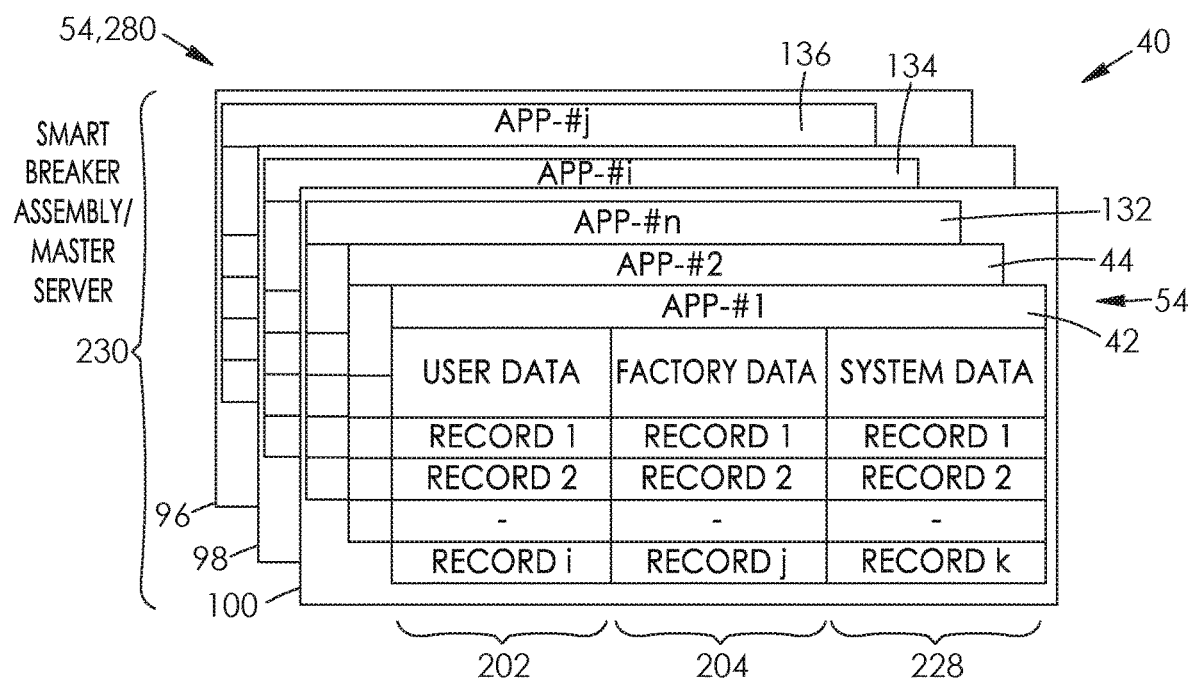
FIG. 10 is a schematic view of the structure of the distributed databases of the smart breaker assembly and the master server of the system of FIG. 1.
Figure 11:
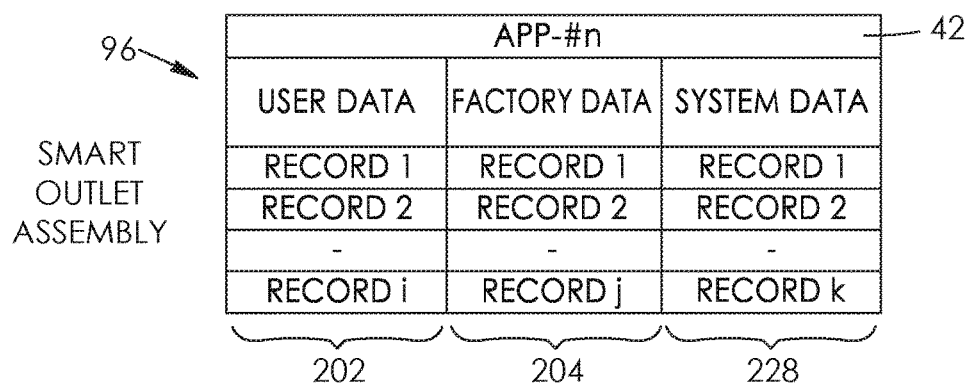
FIG. 11 is a schematic view of the structure of a distributed database for a given one of the smart outlet assemblies of FIG. 1.

Referring to FIG. 11, the smart outlet assemblies generate system data records 228 based on the user-provided data records 202 and manufacturer-provided records 204 of the smart appliances. The records are stored within the smart outlet assemblies and are exchanged with and stored within their corresponding smart breaker assembly 54 seen in FIG. 10. Each smart outlet assembly thus couples to, is in electrical communication with and exchanges database records with its corresponding smart breaker assembly. Referring to FIG. 10, each of the smart breaker assemblies 54 includes stored in memory thereof a collection 230 of database records of all the database records stored in its corresponding smart outlet assembly, as illustrated by smart outlet assemblies 96, 98 and 100.

Figure 5:
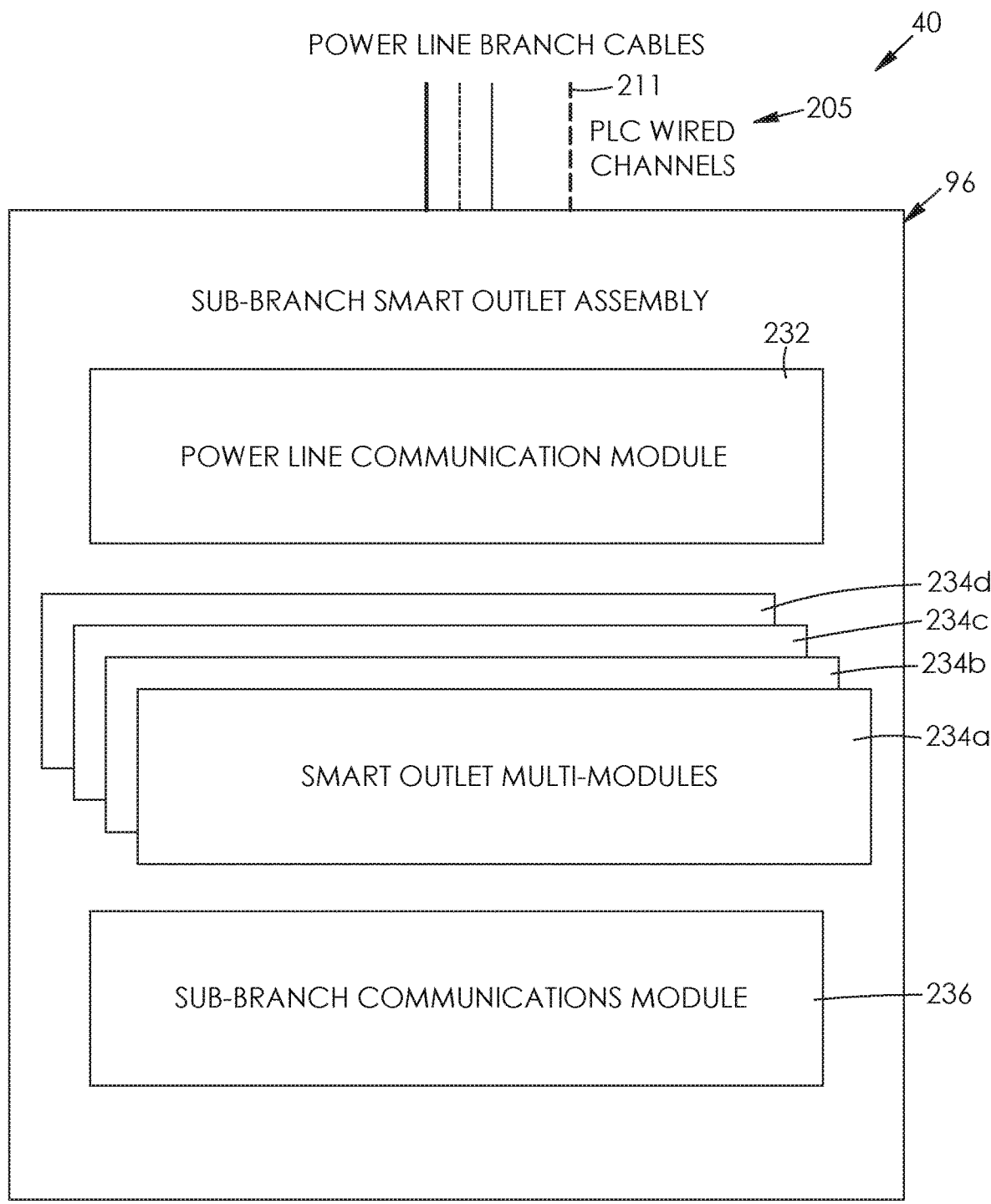
FIG. 5 is a schematic view of one of the sub-branch smart outlet assemblies of FIG. 1, illustrating components thereof including a power line communication module, a plurality of smart outlet modules and a sub-branch communication module.
Figure 6:
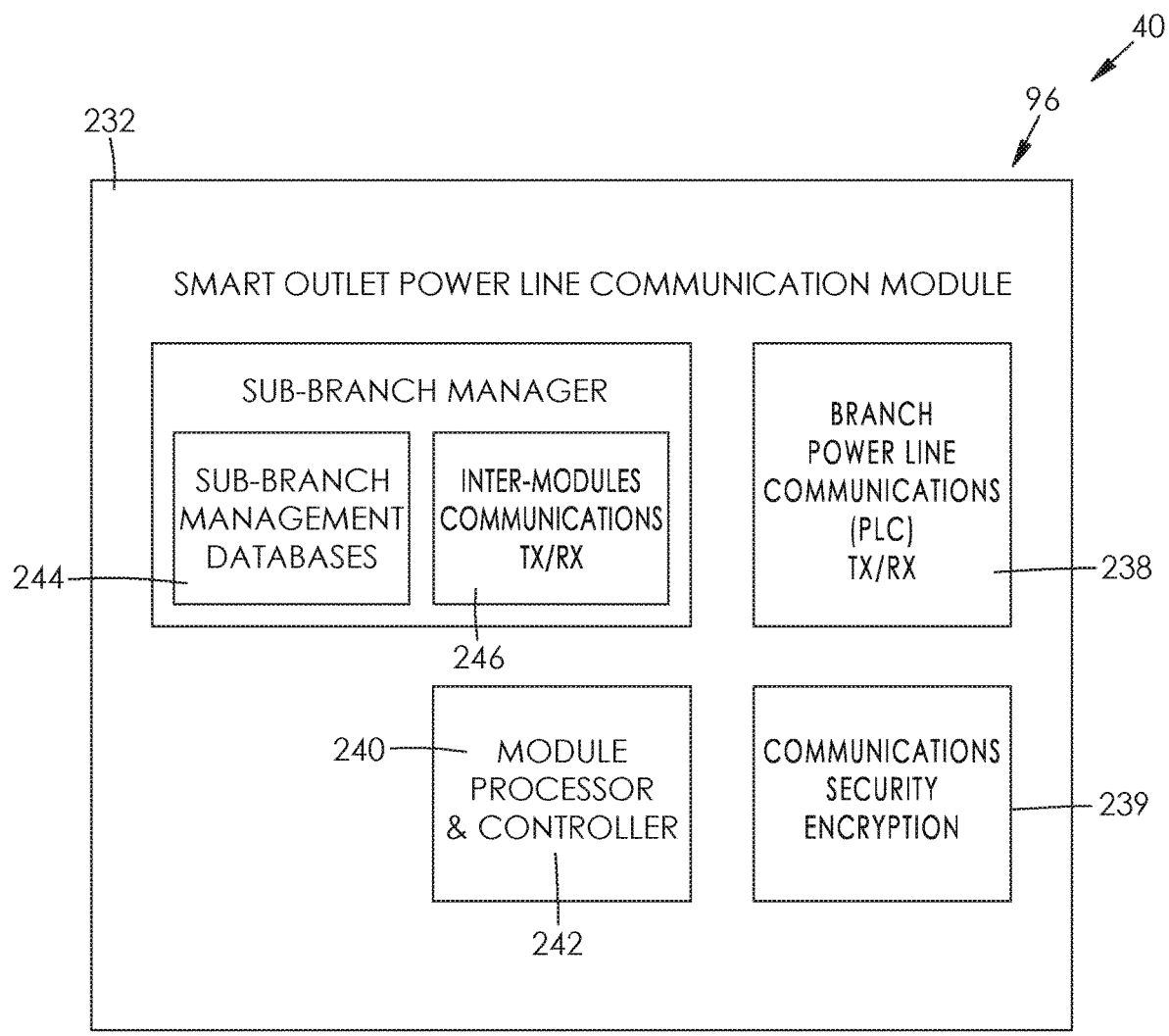
FIG. 6 is a schematic view of the power line communication module of the sub-branch smart outlet assembly of FIG. 5, illustrating components thereof.

Referring to FIG. 5, each smart outlet assembly 96 includes a smart outlet power line communication module 232, a plurality of smart outlet modules 234a, 234b, 234c and 234d, and a sub-branch communication module 236. As seen in FIG. 6, each smart outlet power line communication module includes a multi-channel power line communication transceiver 238 and communications security encryption 239. Inter-module communications from the inter-module communication transceivers are encrypted. Referring to FIGS. 4 and 6, multi-channel power line communication transceivers 208 and 238 of the smart breaker assemblies 54 and smart outlet assemblies 96 are configured to enable wired communication between the smart breaker assemblies and their associated smart outlet assemblies. The smart outlet assemblies and their respective smart breaker assemblies thus communicate via power line communication.

As seen in FIG. 6, each smart outlet power line communication module 232 includes a module processor 240 and a controller 242. The module processors and controllers of the smart outlet assemblies 96 manage and control power line communications, inter-module communications, database accesses and sub-branch power management controls. The inter-module communication assembly is wired and configured to link up processors of the smart outlet assemblies in a modular manner for power management.

Each smart outlet power line communication module 232 includes a sub-branch database 244 configured to collect power management and system management parameters from sub-branches connected to their corresponding said power line communication module is connected.

Figure 3:
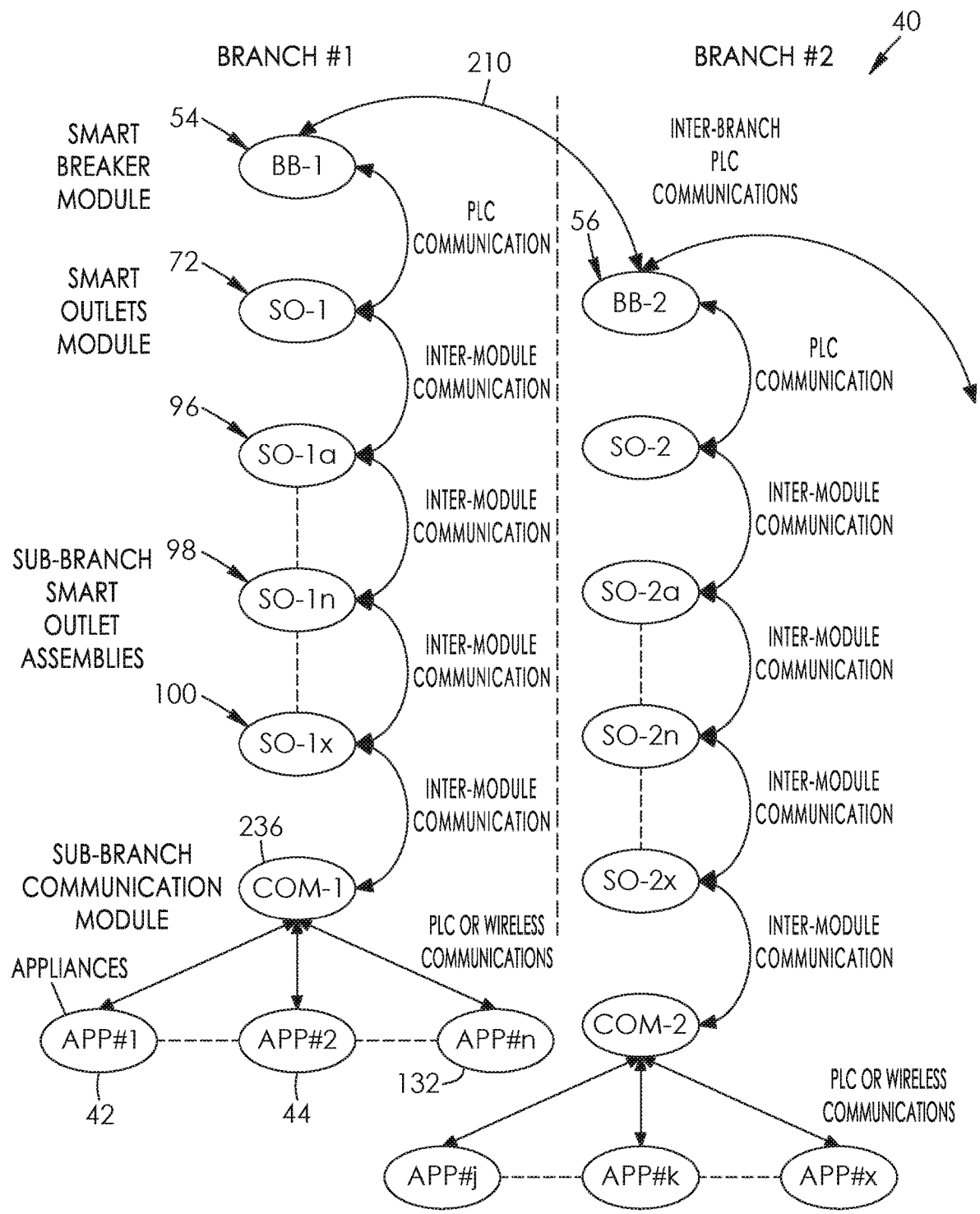
FIG. 3 is a schematic view of the system communications network topology of the system of FIG. 1.

Still referring to FIG. 6, each smart outlet power line communication module includes a multi-channel inter-module communication transceiver 246. Referring to FIG. 5, the sub-branch smart outlet assembly 96 comprises a plurality of smart outlet modules 234*a*, 234*b*, 234*c* and 234*d*. The inter-module communication transceiver 246 communicates with the inter-module communications transceiver 250 in FIG. 7 to coordinate power management with power assigned to the sub-branch and sharing between multiple outlets using database records. Referring to FIG. 3, the multi-channel power line communication transceivers of the smart outlet assemblies 96, 98 and 100 are configured for communication between the power line communication modules of the smart outlet assemblies and any smart outlet module or sub-branch communication module 236. The power line communication transceivers thus enable communications on sub-branches between the appliances 42, 44 and 132 and the outlet assemblies 96, 98 and 100.

Figure 7:
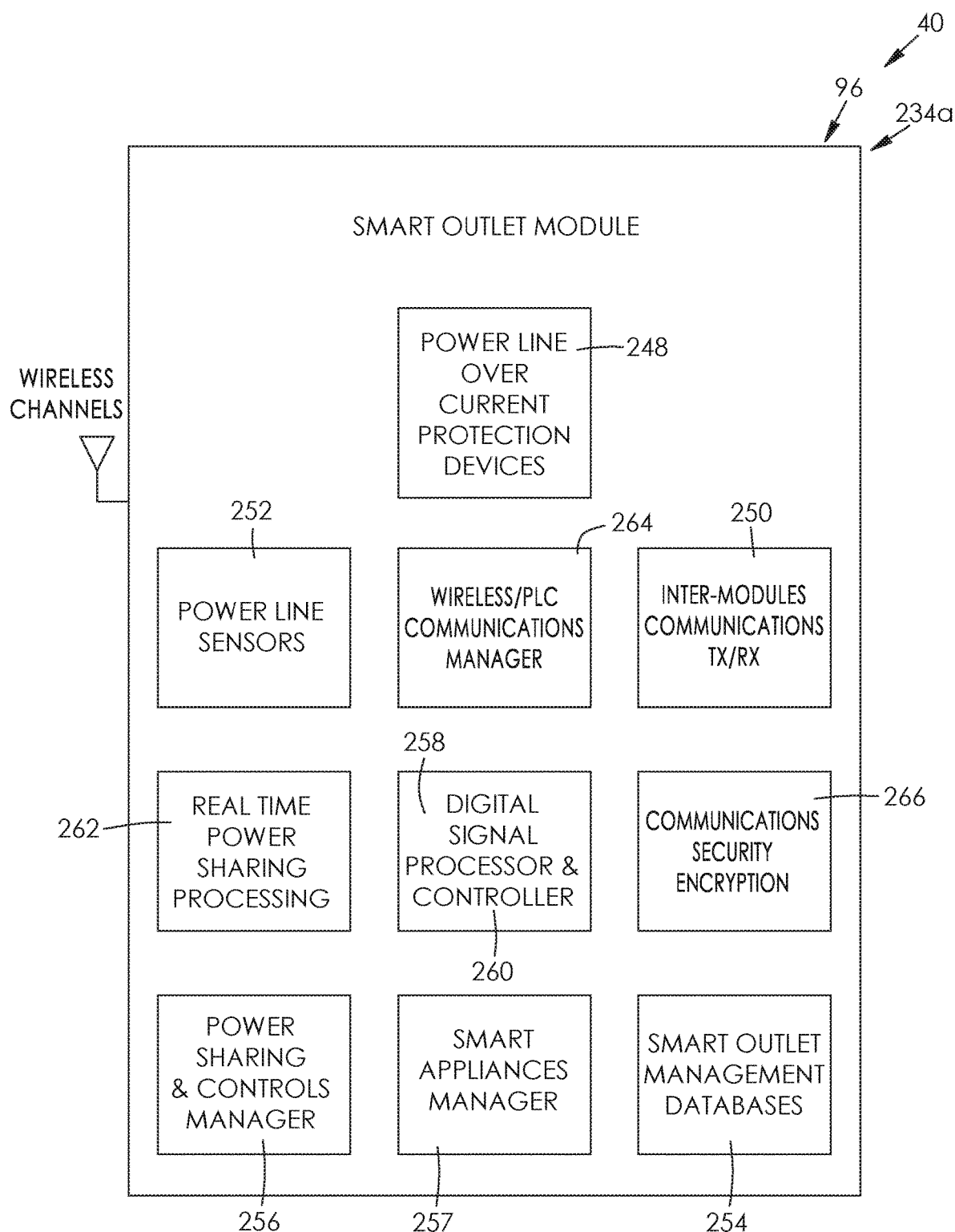
FIG. 7 is a schematic view of one of the smart outlet modules of the sub-branch smart outlet assembly of FIG. 5, illustrating components thereof.

Referring first to FIG. 5 and then to FIG. 3, the smart outlet modules 234*a*, 234*b*, 234*c* and 234*d* are configured to work together with the sub-branch communication module 236 to safely manage power usage of one or more of the appliances 42, 44 and 132 in their corresponding said sub-branches. As seen in FIG. 7, each smart outlet module 234*a* includes a power line overcurrent protection device 248 which functions as a breaker to protect overcurrent loading of sub-branch cables from the loads of the one or more appliances of their corresponding said sub-branches.

Still referring to FIG. 7, each smart outlet module includes a multi-channel inter-module communication transceiver 250 configured for communication between the smart outlet module and the power line communication module, communication between the smart outlet modules, or communication between a given said smart outlet module and the sub-branch communication module of its sub-branch.

Each smart outlet module 234*a* includes power line sensors 252 which are used for measuring voltage, current, power and environmental parameters. Each smart outlet module includes a smart outlet management database 254, a power sharing and controls manager 256, a smart appliances manager 257, at least one digital signal processor 258 and at least one controller 260. The digital signal processors and controllers performs computations and direct of the modules. The digital signal processor 258 processes real time sensing signals from the power line sensors 252 and converts analog sensing signals to digital data for storage and for real time power sharing.

The power sharing and controls managers 256 of the smart outlet modules 234*a* manage real time sensor data, real time power sharing 262 among the appliances based on the power sharing and power usage parameters stored in sub-branch and branch databases. The manager of the smart outlet module works together with controller 260 to control powering up and powering down of a given said branch or any of its said sub-branches through inter-module communications and a wireless/PLC communication manager 264 having encrypted messages, as shown by box 266.

The smart outlet management database 254 stores local power management parameters used for safe power usages and power sharing among electrical appliances connected to its sub-branches which are in turn connected to the smart outlet module 234*a*. The database further stores local environmental parameters and system parameters, such as temperature, cable sizes and the like, for system management.

Figure 8:
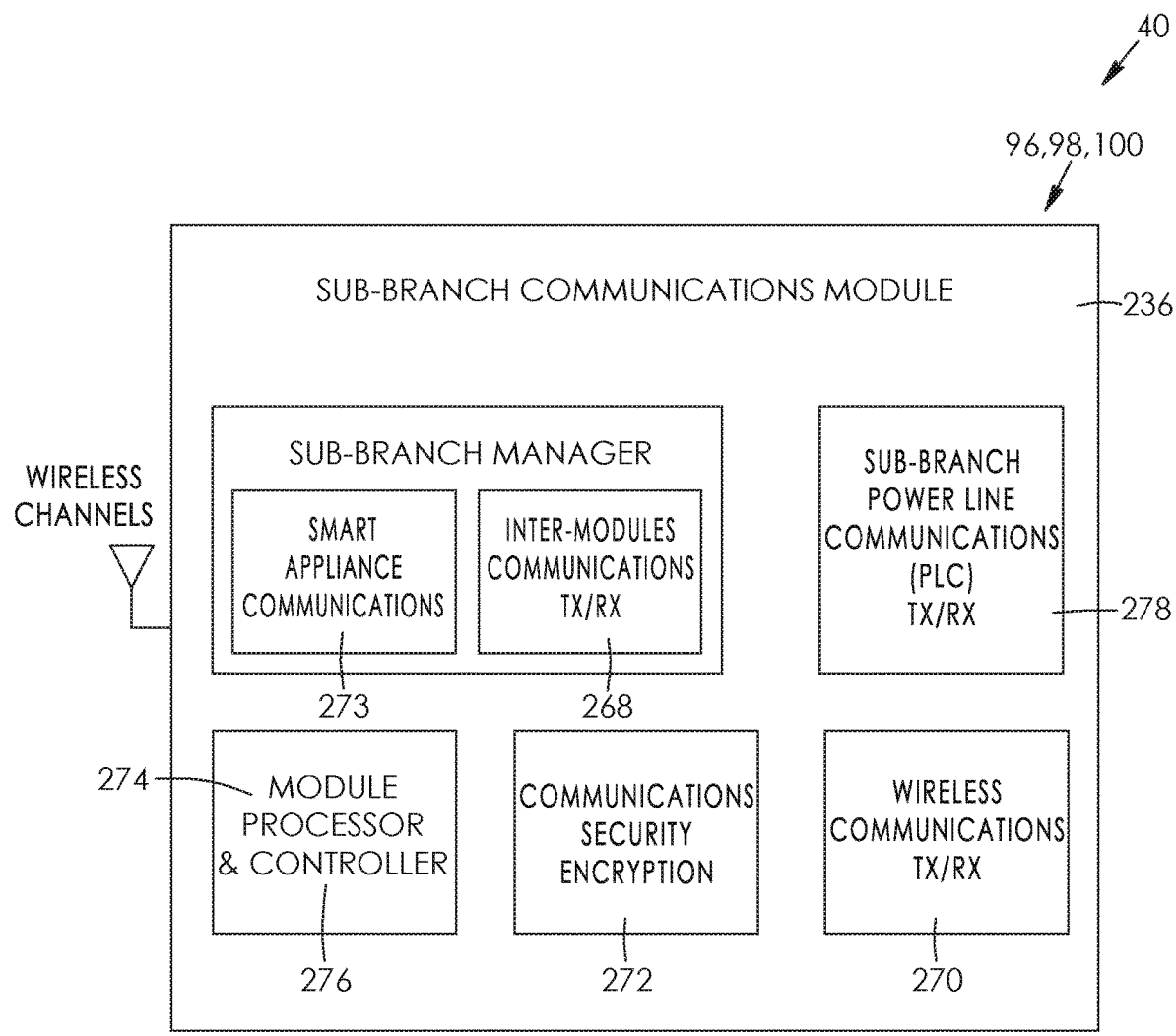
FIG. 8 is a schematic view of the sub-branch communication module of the sub-branch smart outlet assembly of FIG. 5, illustrating components thereof.

Referring to FIG. 8, the sub-branch communication module 236 comprises a multi-channel inter-module communication transceiver 268 and a multi-channel wireless transceiver 270 or optional power line communications transceiver 278 with channel encryption 272 for system security. The inter-module communication transceiver is used for communications between different modules for power management, accessing system databases, safety power sharing, and other system management tasks.

The wireless transceiver 270 or optional power line communication transceiver 278 is used for smart appliance communications 273 between the system 40 and different appliances that include wireless transceivers. Wireless communications are used to access the power requirements of appliances before supplying power for power management and safely accessed power resources. Wireless communication is also used for real time management of connected appliances in the system 40.

The sub-branch communication module 236 includes a module processor 274 and controller 276 which performs computation and directs of the module. The module processor and controller manage communications in the power management system, and manage communications between appliances that have been connected to sub-branches and to new appliances that start new connections to sub-branches.

The sub-branch communication module 236 includes a power line communication transceiver 278. The power line communication transceiver is used for communications along a branch power line and sub-branches power lines, and may optionally communicate with appliances.

As seen in FIG. 1, the system 40 includes a branch management server, in this example a master server 280. As seen in FIGS. 9 and 13, the master server is in electrical communication and exchanges database records 282 with the smart breaker assemblies 54 and 56 of the system. Referring to FIG. 1, master server 280 and smart breaker assemblies 54 communicate via power line communication in this example via conductors 209 and 284 of smart grid communication assembly 205. The power line communication transceivers thus enable inter-branch power line communication between different branches or between a branch and a multi-branch server.

As seen in FIG. 13, the user-provided data records 202, manufacturer-provided records 204 and system data records 228 are stored within the smart breaker assemblies 54 and 56, are exchanged between the smart breaker assemblies and the master server 280, and are stored within the master server. The databases in the master server 280 are remote databases. The remote databases collect all or partial records of the database records stored in the smart breaker assemblies and smart outlet assemblies, and store system records during system management of multiple branches and their sub-branches of the system 40.

The system 40 thus includes distributed databases used to exchange data, in this example the manufacturer-provided records, user-provided data records and the system records among the smart outlet assemblies 98 and 100, the smart breaker assemblies 54 and 56, and the master server 280. The system is configured to include a redundancy of duplicated database records such that during system failures where local branches or sub-branches are isolated by disconnection with the master server or the smart breaker assembly, the redundancy ensures safe operation of the isolated branch(es) or isolated sub-branch(es). Cable sizes and ampacities of conductors are stored in the distributed databases, with the system limiting a branch current to a value less than its rated ampacity and the master server allowing another branch of the system to share any remaining power.

The master server 280 manages and selectively assigns power to respective smart appliances via the smart breaker assemblies 54 and 56 based on the manufacturer-provided and user-provided data records and the system records. The distributed databases are used by the master server to implement power assignments to the smart outlet assemblies 98 and 100, with the power assignments specifying an amount of power, duration of power provided and connecting conditions allocated to a load or a given said appliance at the start of the connection thereof.

Figure 14A:
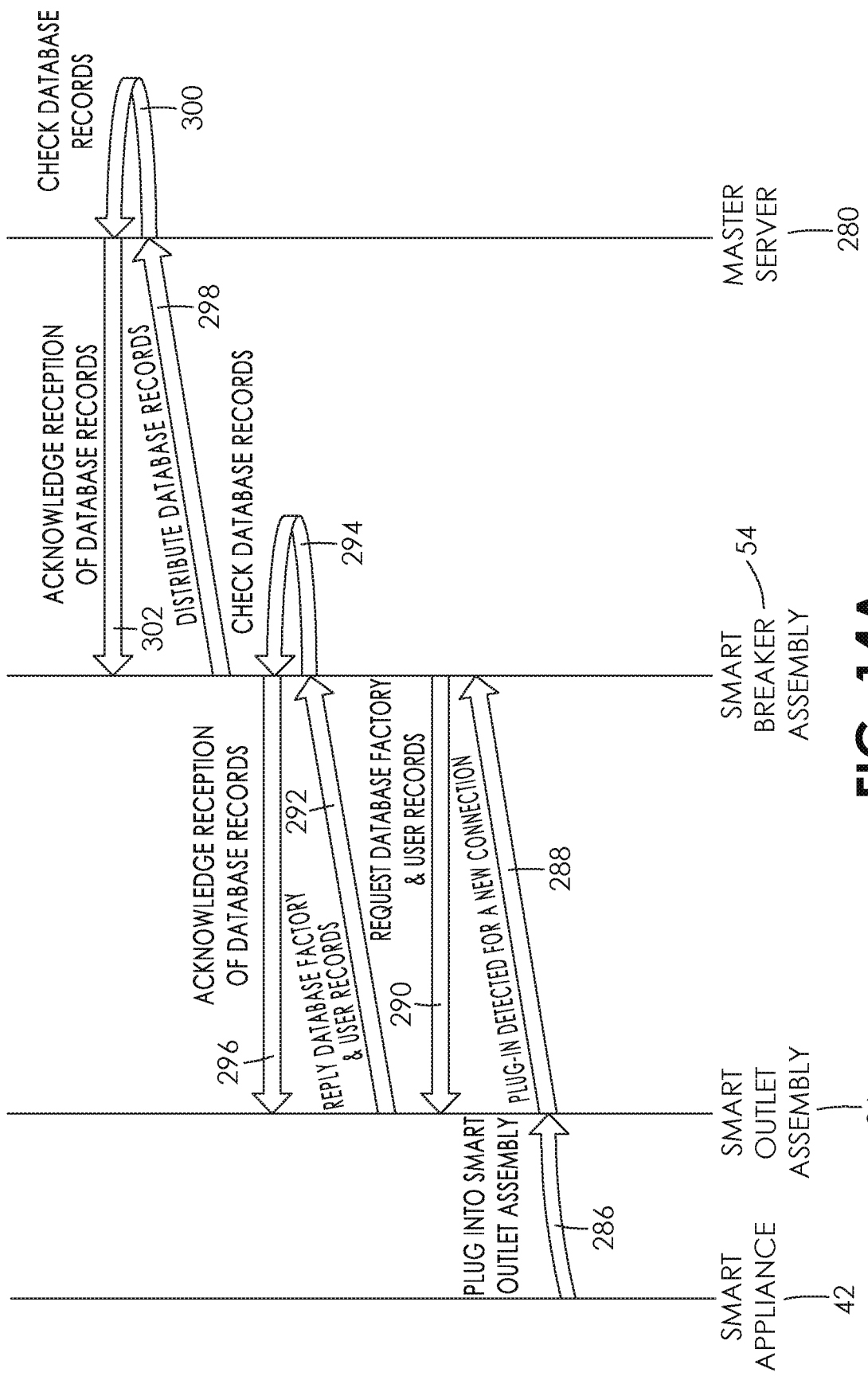
FIGS. 14A and 14B are schematic diagrams of the power assignment and power re-assignment processes of the system of FIG. 1.
Figure 14B:
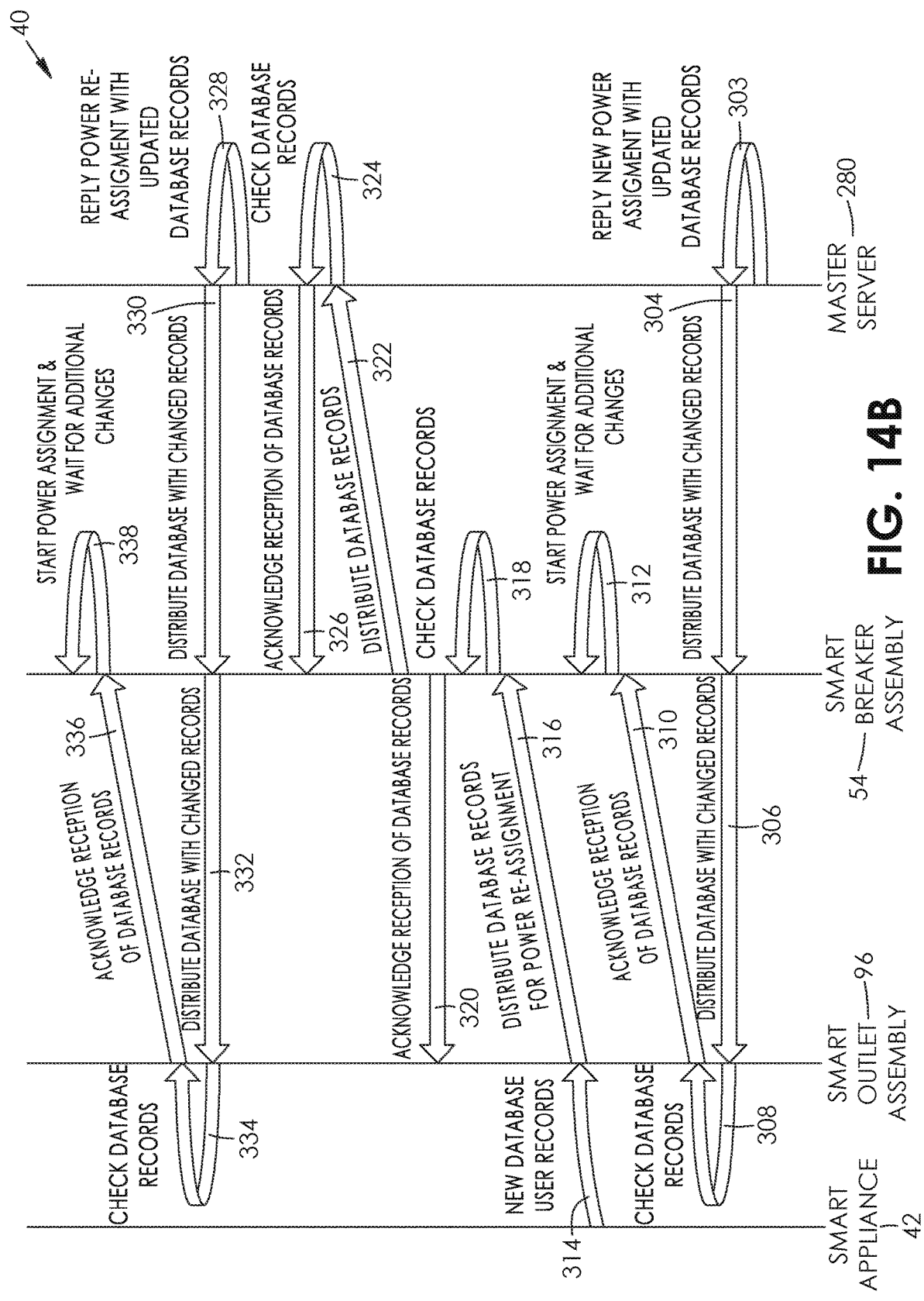

An example of the power assignment and re-assignment process of system 40 is shown in FIGS. 14A and 14B. Referring to FIG. 14A, when smart appliance 42 is plugged into or coupled to smart outlet assembly 96, as shown by arrow 286, the smart outlet assembly receives user-provided and manufacturer-provided data records of the appliance. Current is further detected by a closed-loop current detection circuit of the smart outlet assembly 96. This functions to signal that the plug is connected to the smart outlet assembly and causes the smart outlet assembly to convey a signal 288 to its corresponding smart breaker assembly 54 indicating a plug-in has been detected for a new connection.

The smart breaker assembly 54 thereafter conveys a signal 290 to the smart outlet assembly 96 indicating a request for user-provided and manufacturer-provided data records. The smart outlet assembly conveys a reply signal 292 containing the user-provided and manufacturer-provided data records thereof in response thereto. The smart breaker assembly 54 thereafter checks its database records, as shown by arrow 294, to determine if the user-provided and manufacturer-provided data records received by the smart outlet assembly 96 are legitimate taking into account the records of the appliance 42, and thereafter sends a signal 296 to the smart outlet assembly 96 indicating an acknowledgement of reception of database records. This and the additional checking-steps set out below may function to avoid third party hacking of the system 40, for example.

The smart breaker assembly 54 thereafter conveys or distributes the database records to the master server 280, as shown by arrow 298, and thereafter awaits for an acknowledgement of this signal with a pre-determine time threshold. The master server 280 next checks its database records to determine if the distributed database records from the smart breaker assembly are legitimate, as shown by arrow 300 and thereafter sends an acknowledgement of reception of database records signal 302 to the smart breaker assembly 54.

At this stage and referring to FIG. 14B, the master server processes the power requirements and replies with a new power assignment with updated database records, as shown by arrow 303, taking into account the load request, as well as power consumption requirements for the rest of the system 40. A signal 304 is sent from the master server 280 to the smart breaker assembly 54 regarding the same, and the master server thus conveys or distributes the database with changed records to the smart breaker assembly. The smart breaker assembly in turn receives the updated database and conveys or distributes the same to the smart outlet assembly 96, as shown by arrow 306.

The smart outlet assembly next checks its records to determine if the updated database records are legitimate, as shown by arrow 308, and thereafter sends an acknowledgement of reception of database records signal 310 to the smart breaker assembly 54. Upon the smart breaker assembly receiving said acknowledgement signal within a pre-determined threshold of time, the smart breaker assembly starts the power assignment, enabling a set amount of power/current to be provided to the smart outlet assembly 96 for appliance 42, and waits for any additional changes. This step is shown by arrow 312.

When new or user-altered data records are made to the smart appliance 42 and/or smart outlet assembly 96, such as a user changing wattage requirements or timer settings of an appliance and as indicated by arrow 314, the smart outlet assembly conveys/distributes new database records for power re-assignment to the smart breaker assembly 54, as shown by arrow 316. The smart breaker assembly thereafter checks to determine if the database records are legitimate, as shown by arrow 318, and sends an acknowledgement of reception of database records signal 320 to the smart outlet assembly 96.

The smart breaker assembly 54 thereafter conveys or distributes the user-altered data records to the master server 280, as shown by arrow 322. The master server 280 next checks its database records to determine if the altered distributed database records from the smart breaker assembly are legitimate, as shown by arrow 324 and thereafter sends an acknowledgement of reception of database records signal 326 to the smart breaker assembly 54. At this stage, the master server processes the power requirements and replies with a power re-assignment having updated database records, as shown by arrow 328, taking into account the altered load request, as well as power consumption requirements for the rest of the system 40. A signal 330 is sent from the master server 280 to the smart breaker assembly 54 regarding the same and the master server thus conveys or distributes the database with changed records to the smart breaker assembly. The smart breaker assembly in turn receives the updated database and conveys/distributes the same to the smart outlet assembly 96, as shown by arrow 332.

The smart outlet assembly next checks its records to determine if the updated database records are legitimate, as shown by arrow 334, and thereafter sends an acknowledgement of reception of database records signal 336 to the smart breaker assembly 54. Upon the smart breaker assembly receiving said acknowledgement signal, the smart breaker assembly starts the new/revised power assignment, enabling a potentially revised amount of power/current to be provided to the smart outlet assembly 96 for appliance 42, and waits for any additional changes. This step is shown by arrow 338.

There is only one master server 280 in the multi-branch power distribution/assignment system 40 in this example, with the master server being configured to manage power assignments and re-assignments of multi-branches. There is more than one smart breaker assembly 54 in the multi-branch power distribution/assignment system. Each smart breaker assembly shares the workloads of the master server 280 and manages power assignments and re-assignments of its own branch and sub-branches. The master server is thus not a required device in a single branch system. Without the master server 280, a single branch still works properly.

Figure 15B:
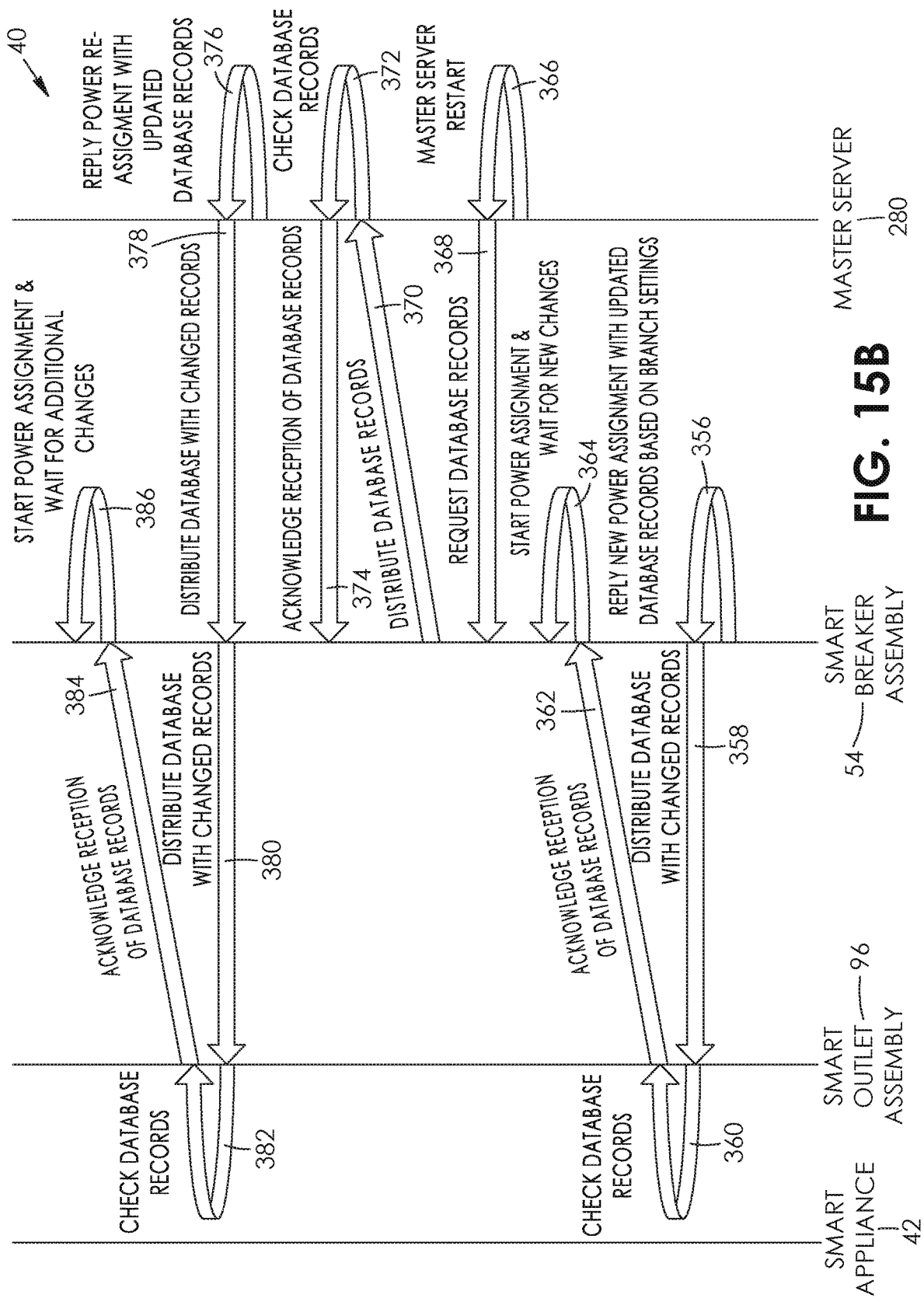

FIGS. 15A and 15B shows an example of the power assignment and re-assignment process where the master server 280 is unreachable. Referring to FIG. 15A, when smart appliance 42 is plugged into or coupled to the smart outlet assembly 96, as shown by arrow 340, the smart outlet assembly receives the user-provided and manufacturer-provided data records of the appliance. Current is also detected by a closed-loop current detection circuit of the smart outlet assembly. This functions to signal that the plug is connected to the smart outlet assembly and causes the smart outlet assembly 96 to convey a plug-in detected for a signal 342 to its smart breaker assembly 54 indicating a new connection.

The smart breaker assembly 54 thereafter conveys a request for user-provided and manufacturer-provided data records signal 344 to the smart appliance 42. The smart outlet assembly 96 conveys a reply signal 346 containing the user-provided and manufacturer-provided data records thereof in response thereto. The smart breaker assembly 54 thereafter checks its database records, as shown by arrow 348, to determine if the user-provided and manufacturer-provided data records are legitimate, taking into account the records of the appliance 42, and thereafter sends an acknowledgement of reception of database records signal 350 to the smart outlet assembly 96. The smart breaker assembly 54 next attempts to convey or distribute the database records to the master server 280, as shown by arrow 352.

If no acknowledgment signal of the reception of the database records is received within a pre-determined time threshold, as shown by arrow 354, this causes the smart breaker assembly 54 to determine that the master server 280 is presently unreachable. In this case and referring to FIG. 15B, the smart breaker assembly 54 processes the power requirements on its own and replies with a new power assignment with updated database records based on existing branch settings, as shown by arrow 356. A signal 358 is sent from the smart breaker assembly to the smart outlet assembly 96 regarding the same and so as to convey or distribute the database with changed records to the smart outlet assembly.

The smart outlet assembly next checks its records to determine if the updated database records are legitimate, as shown by arrow 360, and thereafter sends an acknowledgement of reception of database records signal 362 to the smart breaker assembly 54. Upon the smart breaker assembly receiving said acknowledgement signal within a pre-determined threshold of time, the smart breaker assembly starts the power assignment, enabling a set amount of power/current to be provided to the smart outlet assembly 96 for appliance 42, and waits for any additional changes. This step is shown by arrow 364. Thus, if the master server 280 is unreachable, the smart breaker assembly 54 is configured to selectively assign power to its corresponding smart appliances 42 based on the data records.

In the meantime, the master server may have been restarted by itself or by the user, for example, as shown by arrow 366. Thereafter, the master server 280 is configured to send a request for database records signal 368 to the smart breaker assembly 54.

The smart breaker assembly in response is configured to convey or distribute its data records to the master server, as shown by arrow 370. The master server 280 next checks its database records to determine if the received distributed database records from the smart breaker assembly 54 are legitimate, as shown by arrow 372 and thereafter sends an acknowledgement of reception of database records signal 374 to the smart breaker assembly 54. At this stage, the master server processes the power requirements and replies with a power re-assignment with updated database records, as shown by arrow 376, taking into account the altered load request, as well as power consumption requirements for the rest of the system 40. A signal 378 is sent from the master server 280 to the smart breaker assembly 54 regarding the same and so as to convey or distribute the database with changed records to the smart breaker assembly. The smart breaker assembly in turn receives the updated database and conveys/distributes the same to the smart outlet assembly 96, as shown by arrow 380.

The smart outlet assembly next checks its records to determine if the updated database records are legitimate, as shown by arrow 382, and thereafter sends an acknowledgement of reception of database records signal 384 to the smart breaker assembly 54. Upon the smart breaker assembly receiving said acknowledgement signal, the smart breaker assembly starts the power re-assignment, enabling a potentially revised amount of power/current to be provided to the smart outlet assembly 96 for appliance 42, and waits for any additional changes. This step is shown by arrow 386.

Figure 16A:
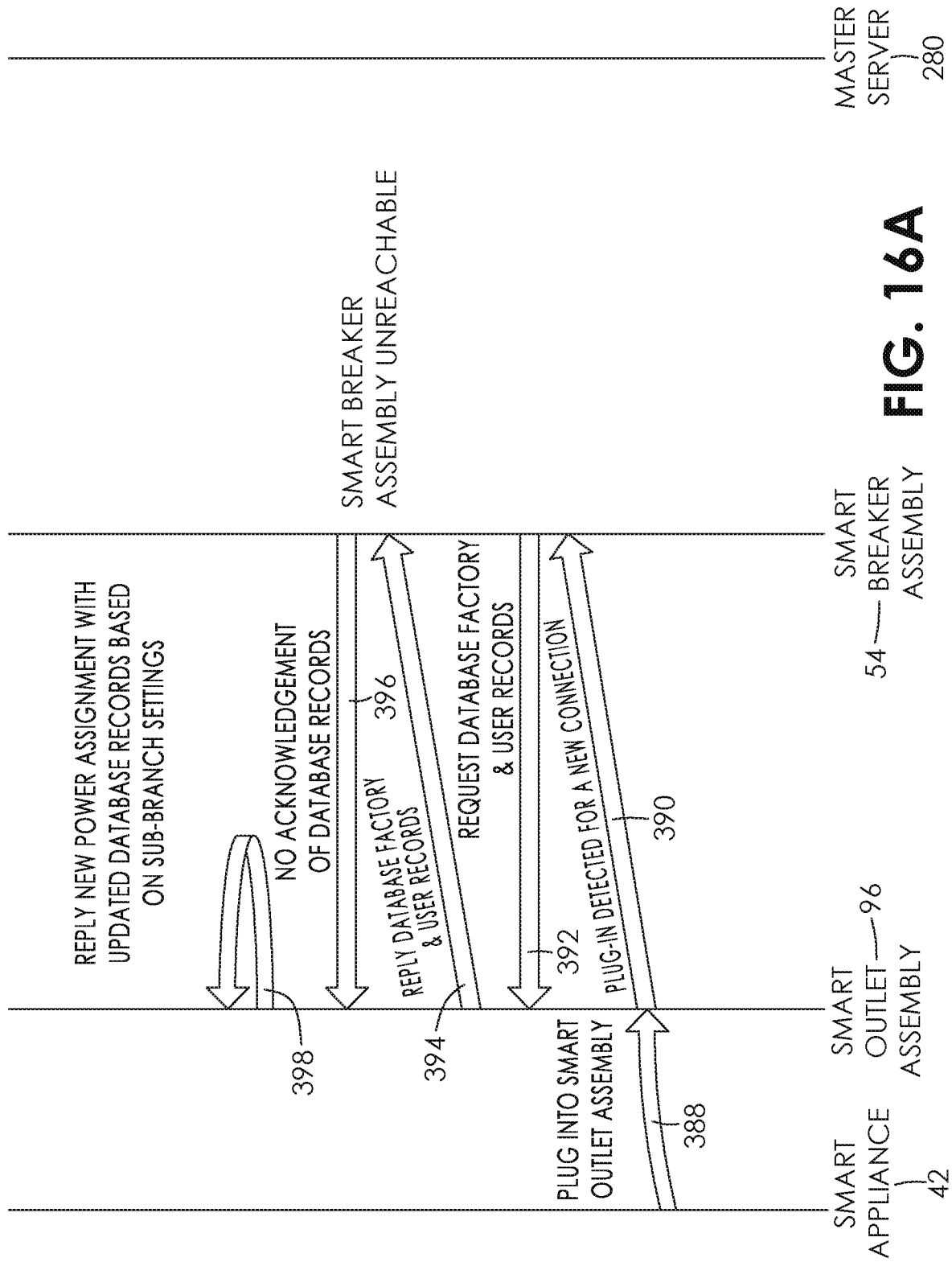
FIGS. 16A and 16B are schematic diagrams of the power assignment and power re-assignment processes when the smart breaker assembly of FIG. 1 is unreachable.
Figure 16B:
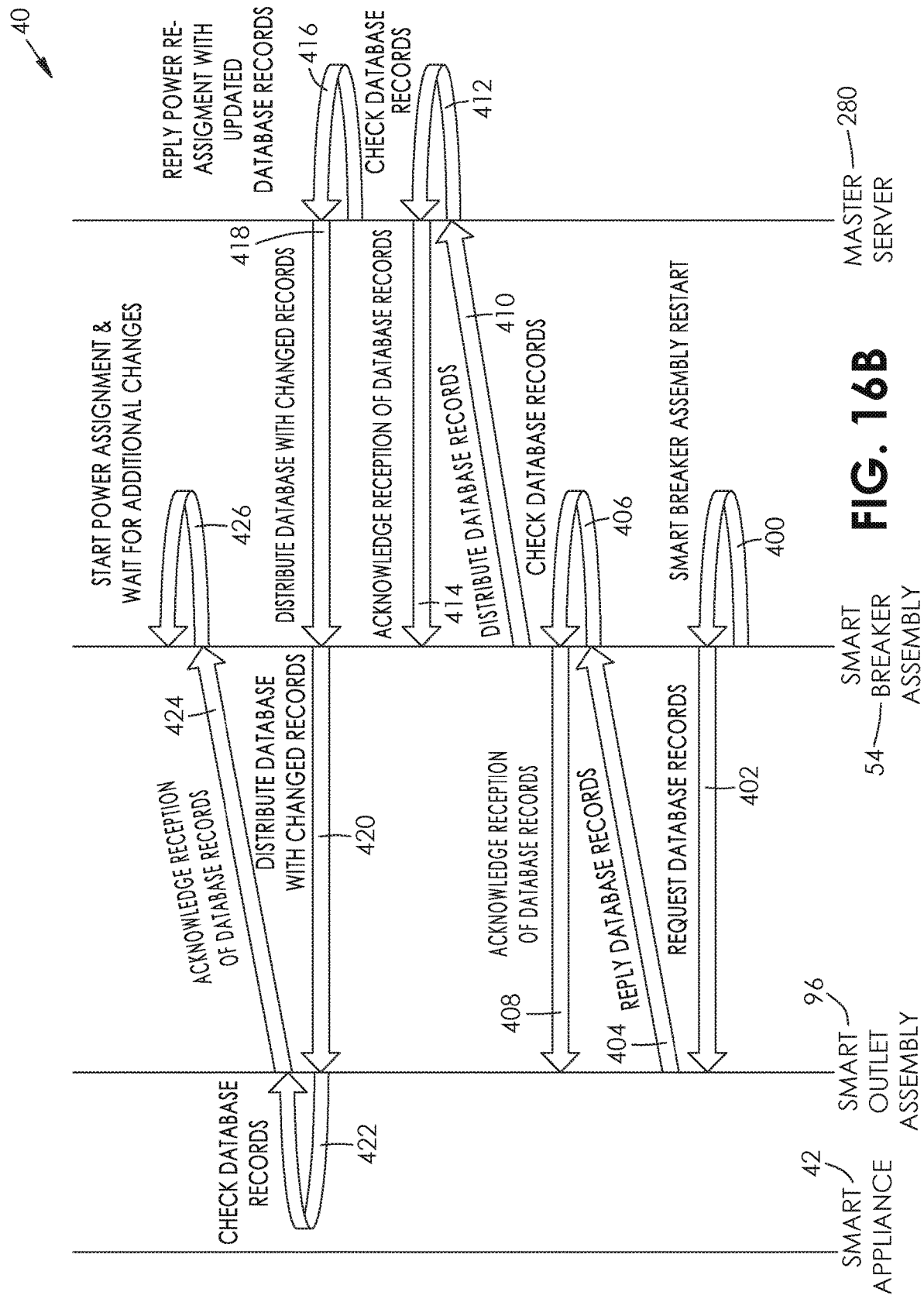

FIGS. 16A and 16B show an example of the power assignment and re-assignment process where the smart breaker assembly 54 is temporarily unreachable. Referring to FIG. 16A, when smart appliance 42 is plugged into or coupled to the smart outlet assembly 96, as shown by arrow 388, the smart outlet assembly receives the user-provided and manufacturer-provided data records of the appliance. Current is also detected by a closed-loop current detection circuit of the smart outlet assembly. This functions to signal that the plug is connected to the smart outlet assembly 96 and causes the smart outlet assembly to convey a signal 390 to its smart breaker assembly 54 indicating a plug-in detected for a new connection.

The smart breaker assembly 54 may thereafter convey a request for user-provided and manufacturer-provided data records signal 392 to the smart outlet assembly 96. The smart outlet assembly conveys a reply signal 394 containing the user-provided and manufacturer-provided data records thereof in response thereto.

If no acknowledgment signal of the reception of the database records is received from the smart breaker assembly 54 to the smart outlet assembly 96 within a pre-determined time threshold, as shown by arrow 396, this causes the smart outlet assembly to determine that the smart breaker assembly 54 is presently unreachable. In this case, the smart outlet assembly processes the power requirements on its own and replies with a new power assignment with updated database records based on existing sub-branch settings, as shown by arrow 398. The smart outlet assembly may thereafter enable a given amount or range of power/current to be provided to the smart appliance 42.

In the meantime and referring to FIG. 16B, the smart breaker assembly 54 may have been restarted by itself or by the user, for example, as shown by arrow 400. Thereafter, the smart breaker assembly is configured to send a request for database records signal 402 to the smart outlet assembly 96.

The smart outlet assembly in response is configured to convey or distribute its data records to the smart breaker assembly 54, as shown by arrow 404. The smart breaker assembly next checks its database records to determine if the received distributed database records from the smart breaker assembly are legitimate, as shown by arrow 406 and thereafter sends an acknowledgement of reception of database records signal 408 to the smart outlet assembly 96. The smart breaker assembly 54 thereafter conveys or distributes the database records to the master server 280, as shown by arrow 410, and thereafter awaits for an acknowledgement of this signal with a pre-determine time threshold.

The master server 280 next checks its database records to determine if the distributed database records from the smart breaker assembly are legitimate, as shown by arrow 412 and thereafter sends an acknowledgement of reception of database records signal 414 to the smart breaker assembly 54. At this stage, the master server processes the power requirements and replies with a power re-assignment with updated database records, as shown by arrow 416, taking into account the load request, as well as power consumption requirements for the rest of the system 40. A signal 418 is sent from the master server 280 to the smart breaker assembly 54 regarding the same and so as to convey or distribute the database with changed records to the smart breaker assembly. The smart breaker assembly in turn receives the updated database and conveys/distributes the same to the smart outlet assembly 96, as shown by arrow 420.

The smart outlet assembly thereafter checks its records to determine if the updated database records are legitimate, as shown by arrow 422, and next sends an acknowledgement of reception of database records signal 424 to the smart breaker assembly 54. Upon the smart breaker assembly receiving said acknowledgement signal within a pre-determined threshold of time, the smart breaker assembly starts the power assignment, enabling a potentially revised amount or range of power/current to be provided to the smart outlet assembly 96 for appliance 42, and waits for any additional changes. This step is shown by arrow 426.

The master server thus manages and selectively re-assigns power to respective smart appliances via the smart breaker assemblies based on the manufacturer-provided data records, the user-provided data records and the system records. The distributed databases are used by the master server to implement power re-assignments to the smart outlet assemblies, with the power re-assignments comprising a change of demand after the power assignment is completed or interrupted, and with the power re-assignment being driven to ensure safe power-usage operation. During the power re-assignments, the master server re-defines an amount of power, duration of power, and connecting conditions allocated to a load or given said appliance where a request to make a change has been signaled by the master server, the smart breaker assembly, the smart outlet assemblies or the appliances.

The master server manages power assignments and re-assignments for the circuit branches, including the sub-branches, based on distributed database records comprising manufacturer-provided data, user-provided data and system records, and is configured to provide power assignments and power re-assignments based on the distributed database records and dynamic changes to the system for power sharing, system management, and home automation.

The master server is also configured to implement power sharing between the smart outlet assemblies based on power assignment and re-assignment in response to changing of the loading of the power line conductors in terms of current in branches or sub-branches of the system.

The master server may include a power sharing scheme that uses the distributed database records to keep track of the various power usages and settings of sub-branches in order to increase overall power usage by time sharing and to improve power safety by limiting assignments of power that would exceed load thresholds. As seen in FIG. 2, a star topology is used to manage branch and sub-branch communication and the power sharing scheme.

Figure 18A:
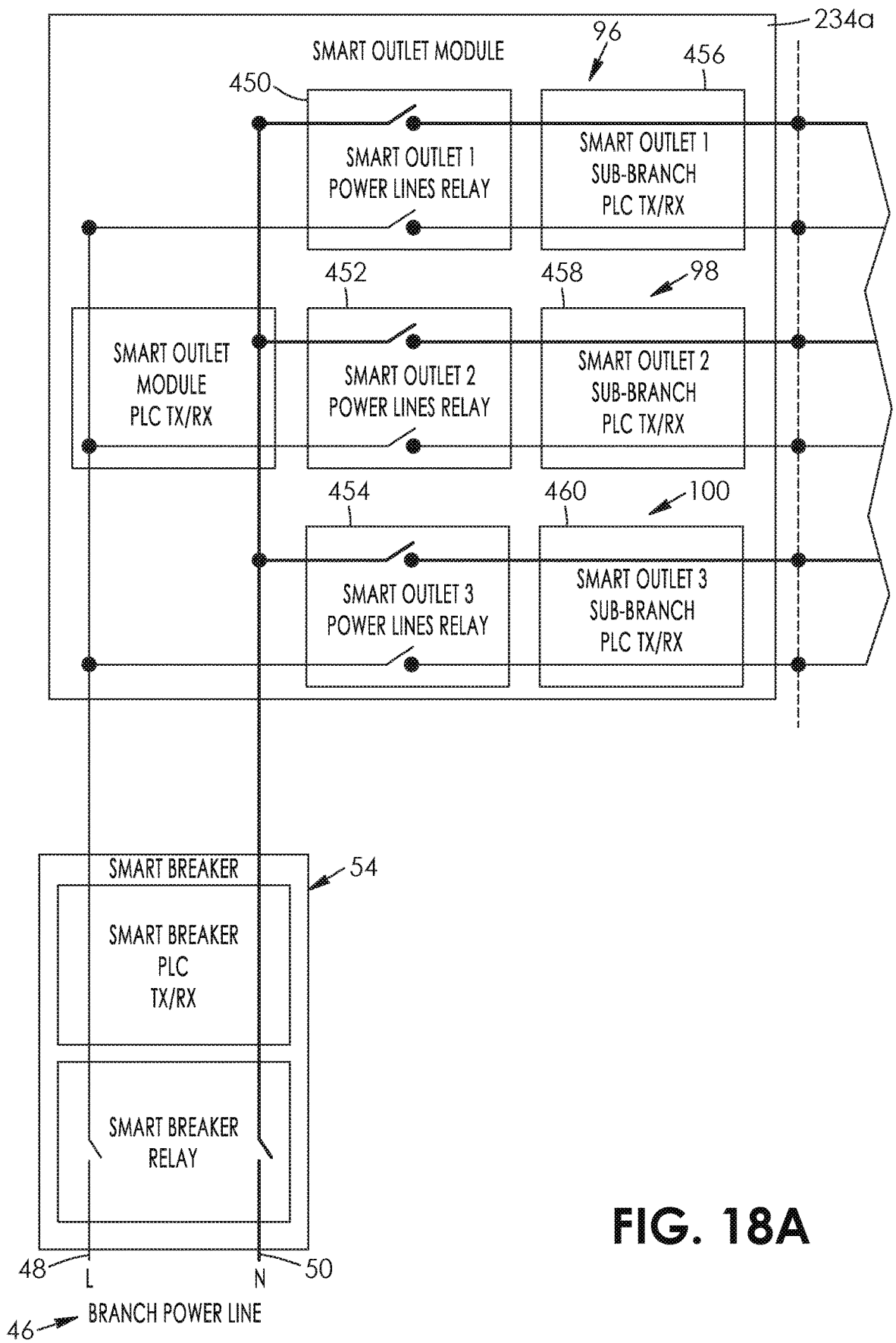
FIGS. 18A and 18B are simplified schematic views of the smart breaker assembly of FIG. 1, the smart outlet module of FIG. 7, smart plug assemblies of FIG. 17, and smart appliances of FIG. 1, illustrating sub-branch power line communications between the same.
Figure 18B:
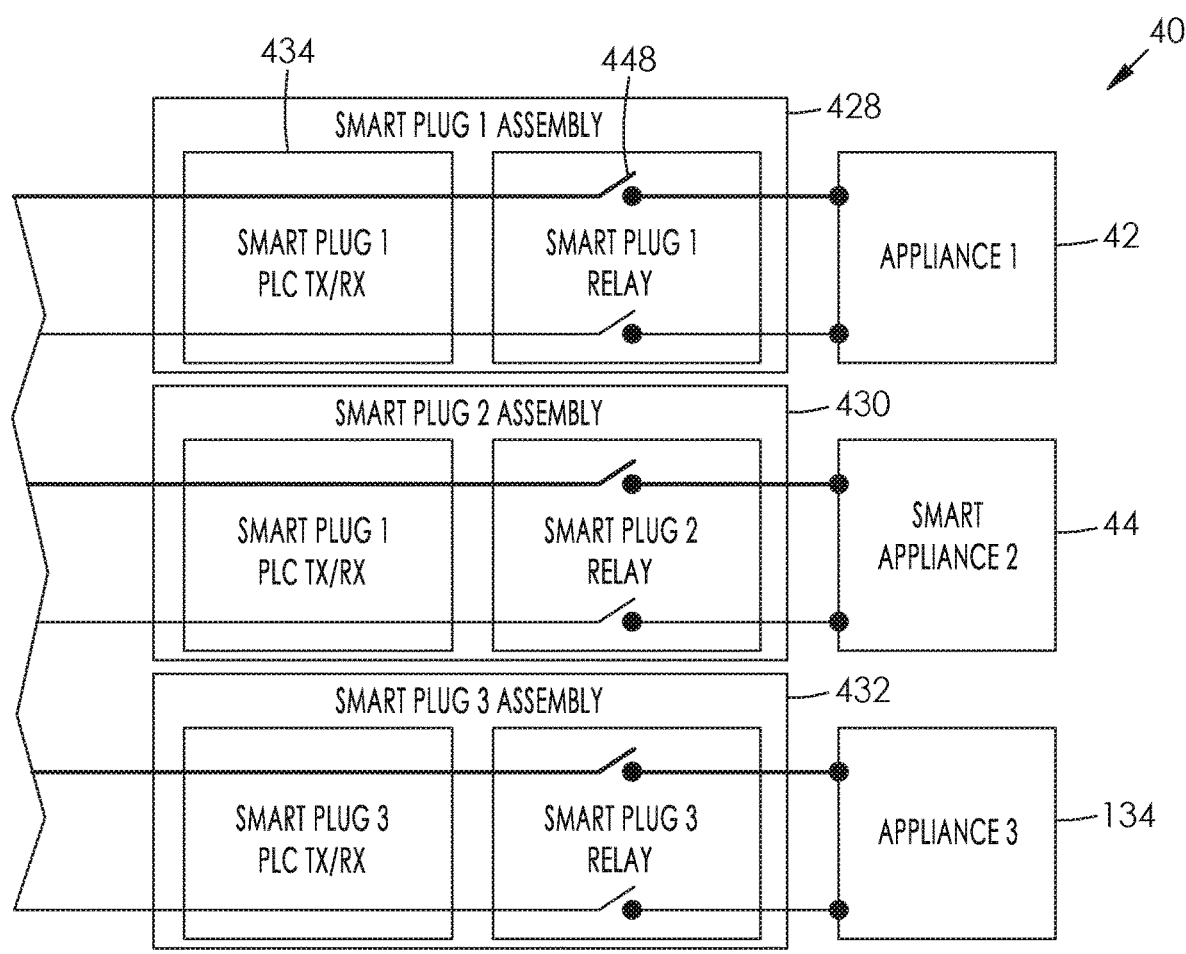

Referring to FIG. 18B, the system 40 further includes a plurality of smart plug assemblies 428, 430 and 432.

As seen with reference to FIGS. 18A and 18B, when an appliance 42 is plugged into a smart outlet assembly 96, there are some requirements to automate the process in order to manage the amount of power distributed to the appliance based on user-defined schedules and conditions, and manufacturer defined power requirements and related information. The automated process is configured to promote safe and reliable power usage, including user and child safety, and system repair when system faults, such as blackouts or brownouts, occur. The smart plug assemblies 428, 430 and 432 may contribute important roles in the system 40.

Figure 17:
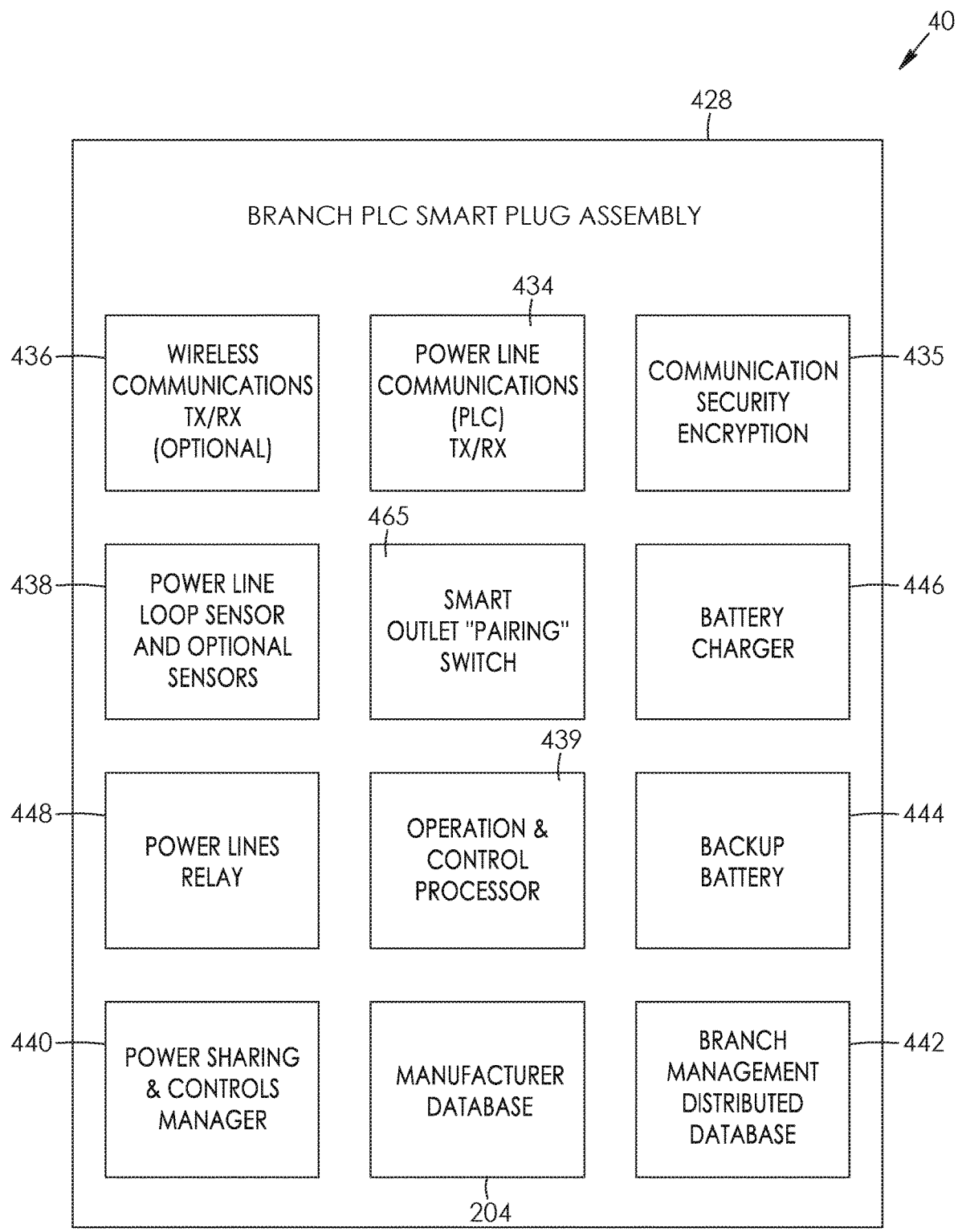
FIG. 17 is a schematic view of a smart plug assembly of the system of FIG. 1 according to a first aspect, the smart plug assembly being configured for power line communication.

FIG. 17 shows a wired smart plug assembly 428 that employs a power line communication transceiver 434 with channel encryption 435 for system security for communication between smart outlet assemblies and the smart plug assemblies. These transceivers are practical for large appliances, such as an electric range, a refridgerator, and the like.

The assembly 428 may further optionally include a wireless communication transceiver 436 for communication between the smart outlet assemblies and smart plug assemblies. Wireless transceivers may be more practical approach in terms of price consideration and for small appliances such as a power adapter, an iron and the like.

Each of the smart plug assemblies 428 includes a sensor assembly 438 that in this example includes a power line loop sensor, and an operation and control processor 439 which performs computation and directs the assembly. The power line loop sensor measure voltage, current, power and environmental parameters, with the processor processing real time analog sensing signals from said sensors and converting the analog sensing signals to digital signals for storage and real time power sharing. The processor 439 functions to process real time signals captured by the power line loop sensor or additional optional sensors of the sensor assembly 438, such as voltage/current and temperature sensors, process power calculations, control relay operations and manage communications associated therewith.

Each of the smart plug assemblies 428 includes a power sharing and controls manager 440 that manages real time sensor data. Each of the smart plug assemblies includes manufacturer-provided data records 204. Each of the smart plug assemblies 428 includes a branch management distributed database 442 that stores system or user defined power sharing and power usage parameters of the appliance associated therewith for power management. The branch management database further stores environmental parameters and system parameters, including temperature data and cable size requirements, for system management.

The smart plug assemblies 428 include back-up batteries 444 in this example for powering the assemblies if the power source 46 seen in FIG. 1 is temporarily unavailable. Each smart plug assembly includes a battery charger 446 in this example for selectively re-charging the back-up battery when the power source is reconnected to the smart plug assemblies. Each of the smart plug assemblies 428 includes power line relays 448 for power distribution. The placement of power line communication transceivers is important to avoid disconnection of wired communications when the power lines are disconnected by switching relays.

FIGS. 18A and 18B are simplified illustrations showing power line communications in an electrical branch or sub-branches with switching relays 448 using power line communication smart plug assemblies 428, 430 and 432 to communicate with a smart outlet module 234a. The smart outlet module comprises a plurality of power line relays 450, 452 and 454 which couple to and are associated with a plurality of outlets 456, 458 and 460 and smart breaker assembly 54. In normal cases, power line communications between the smart outlet power line communication module 234a and smart breaker assembly 54 would always be connected. If the system 40 properly controls the relays 450, 452 and 454 and links, the smart outlet module 234a can combine the sub-branch power line transceiver and the power line module transceiver using a single multichannel transceiver.

Figure 23:
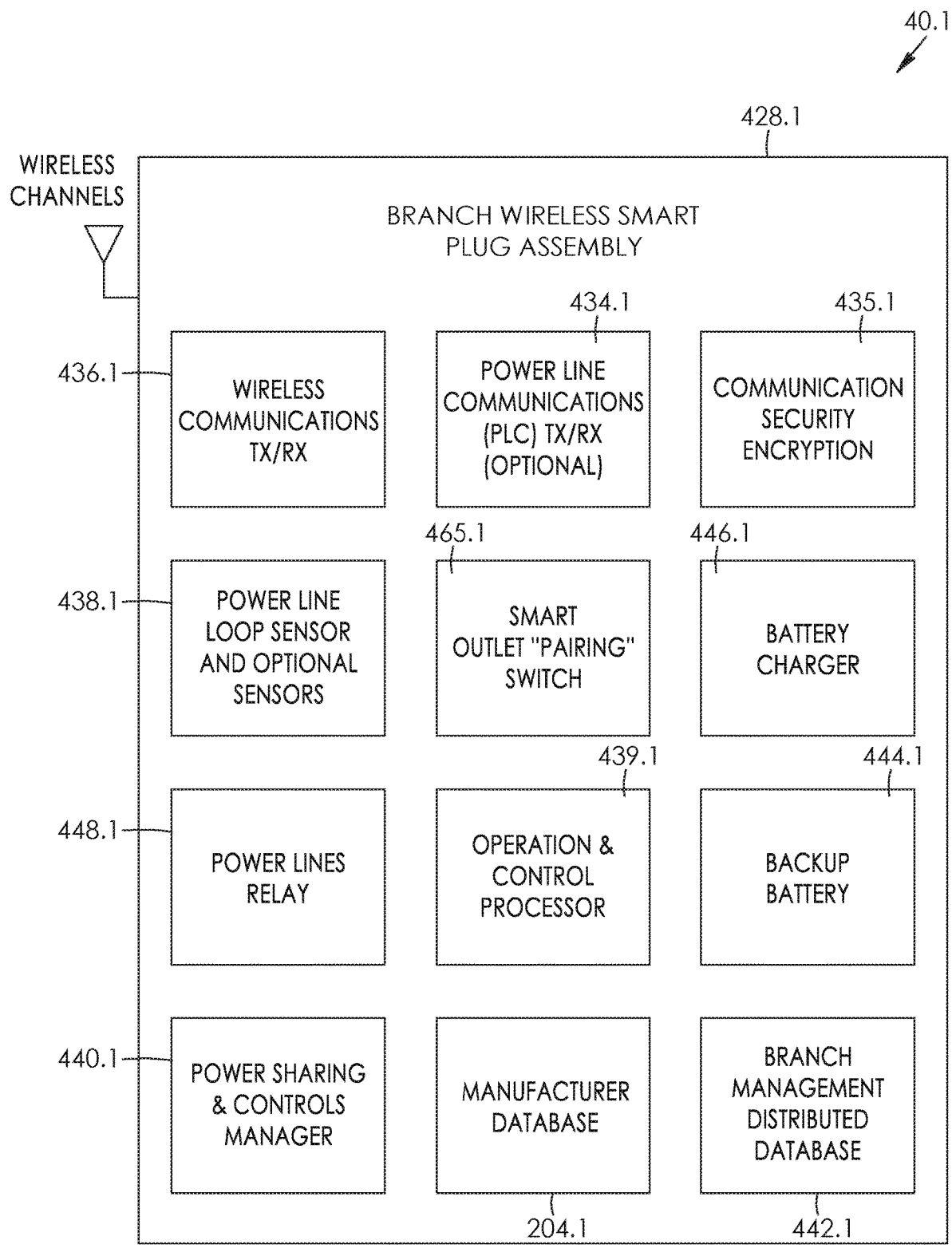
FIG. 23 is a schematic view of a smart plug assembly of the system of FIG. 1 according to a second aspect, the smart plug assembly being configured for wireless communication.
Figure 24A:
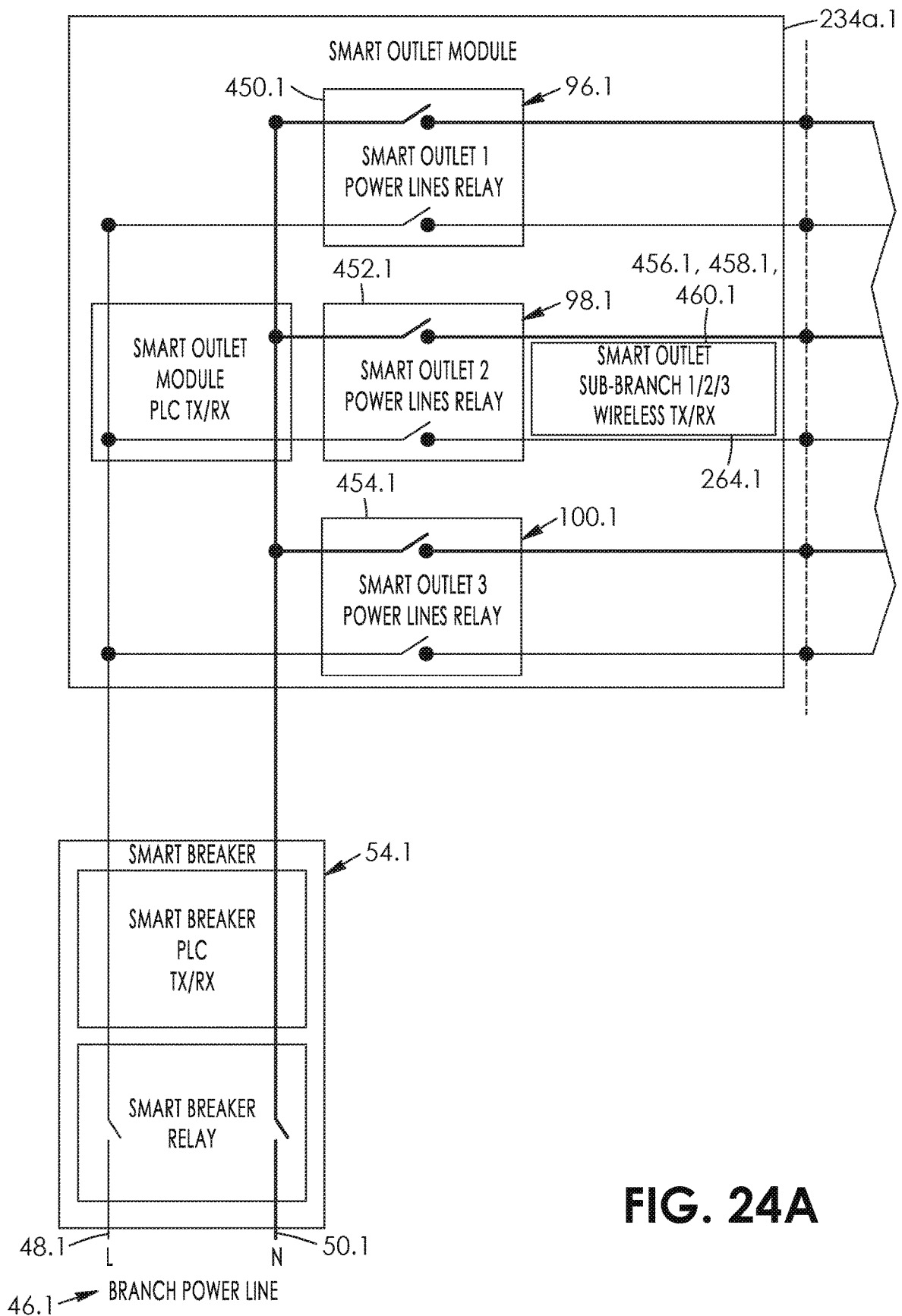
FIGS. 24A and 24B are simplified schematic views of the smart breaker assembly of FIG. 1, the smart outlet module of FIG. 7, the smart plug assemblies of FIG. 23, and the smart appliances of FIG. 1, illustrating sub-branch wireless communications between the same.
Figure 24B:
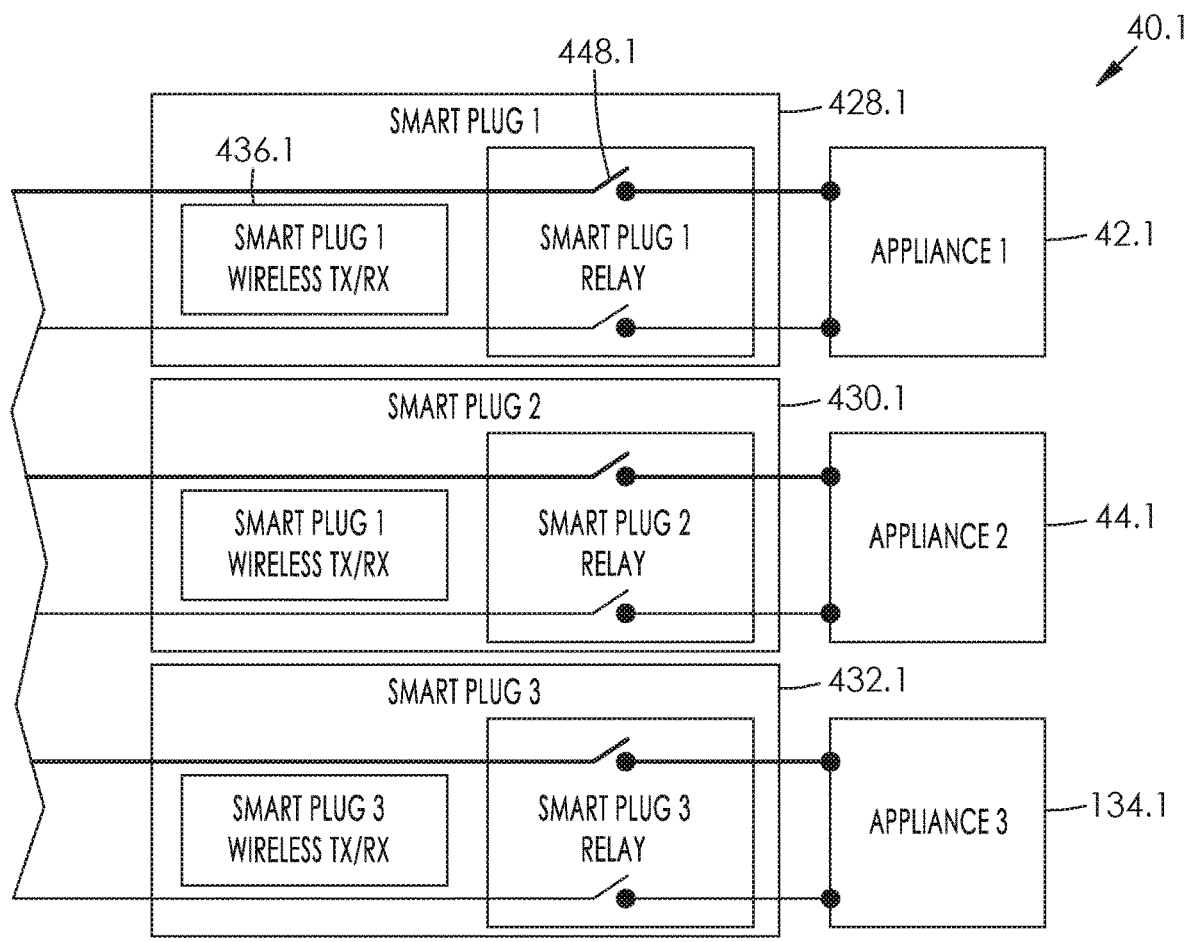

The smart plug assemblies 428.1 and system 40.1 of FIGS. 23 and 24A-24B are similar to the smart plug assemblies 428 and system 40 of FIGS. 17 and 18A-18B with like parts having like numbers and functions with addition of decimal extension ".1". Smart plug assemblies 428.1 are wireless and employ a wireless transceiver 436.1. For system 40.1, wireless communication is employed in connecting smart plug assemblies and smart outlet assemblies, and thus a single wireless transceiver with multiple channels is sufficient to handle communications in multiple sub-branches because of no restriction on the number of connected conductors. FIGS. 24A and 24B show as a simplified illustration of wireless communication in electrical sub-branches with switching relays 450.1, 452.1 and 454.1 using wireless smart plug assemblies 428.1, 430.1 and 432.1 to communicate with both smart outlet module 234a.1 having multiple outlets 456.1, 458.1 and 460.1 and smart breaker assembly 54.1.

Plugging smart plug assemblies 428, seen in FIG. 18B, into smart outlet assembly 96 seen in FIG. 18A, and unplugging smart plug assemblies from smart outlet assemblies affects power safety, user safety or child safety, automation of power assignments and re-assignments, inter-module communications and the like. Two relevant processes in this regard are: 1) pairing a smart plug assembly and a smart outlet assembly in a sub-branch, and 2) fault detection when unauthorized plug-ins, intentional or unintentional interruptions, such as accidentally unplugging a smart plug assembly from its smart outlet assembly, blackouts, brownouts, human or animal interference, for example.

Under normal circumstances, a smart outlet assembly 96 may either continuously provide power or discontinuously/periodically provide power based on a scheduling timer. If a smart plug assembly 428 is unplugged intentionally or unintentionally during a 'power is up' time, the smart plug assembly senses a voltage drop across power lines and the smart outlet assembly senses no current is drawn in the circuit. The system 40 is capable of determining if the smart plug assembly is still attached in this manner.

The system 40 as herein described may include a scanning signal and closed loop current detection to determine if the smart plug assembly 428 is attached to a smart outlet assembly 96 during pairing up of the smart outlet assembly and the smart plug assembly, or prior to applying power after pairing, or prior to re-applying power to a smart plug assembly every time after interruption intentionally or unintentionally.

Figure 19A:
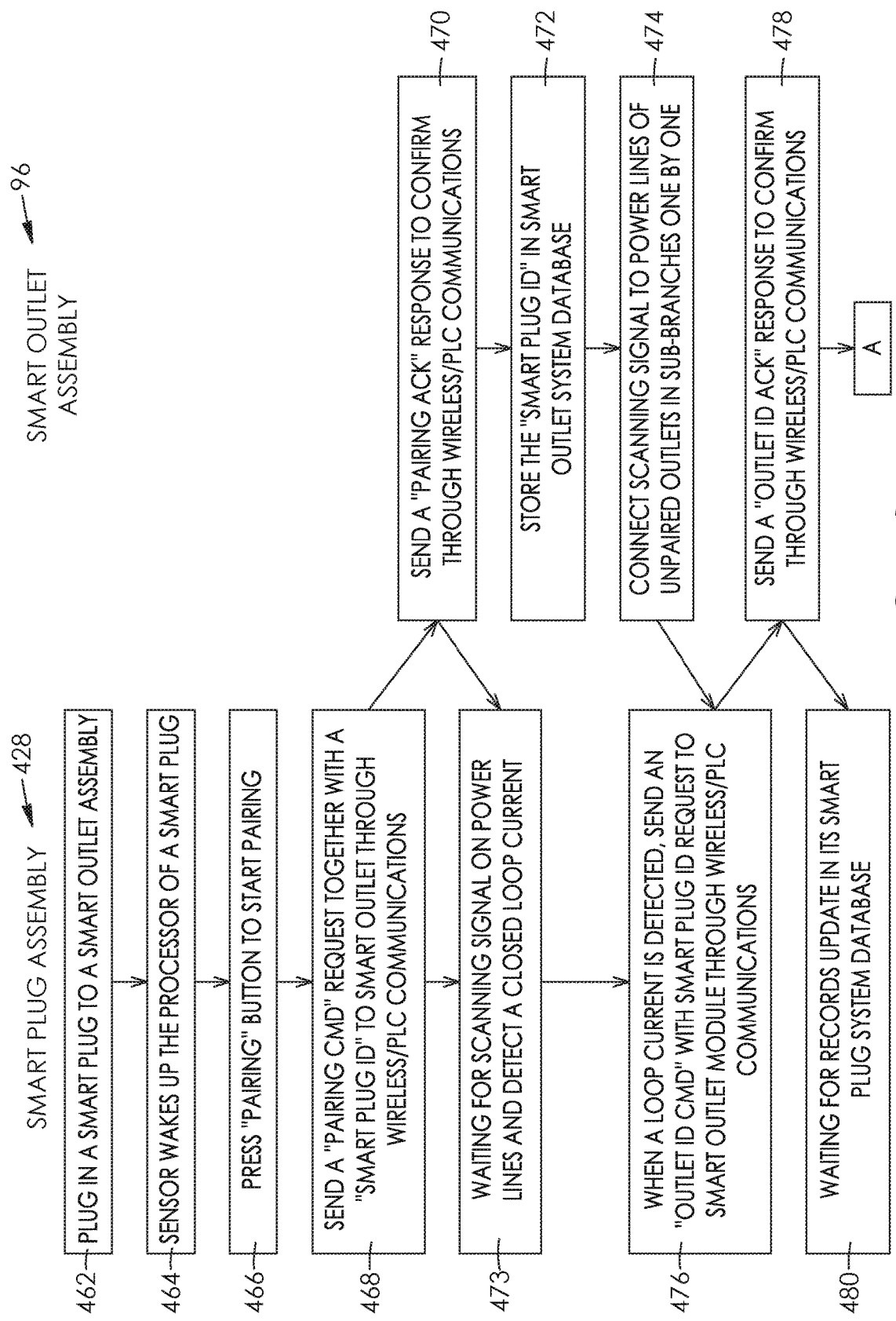
FIGS. 19A and 19B are schematic views of a pairing mechanism and method for linking the smart plug assembly of FIGS. 17 and 18A to 18B with one of the smart outlet assemblies of FIG. 1.
Figure 19B:
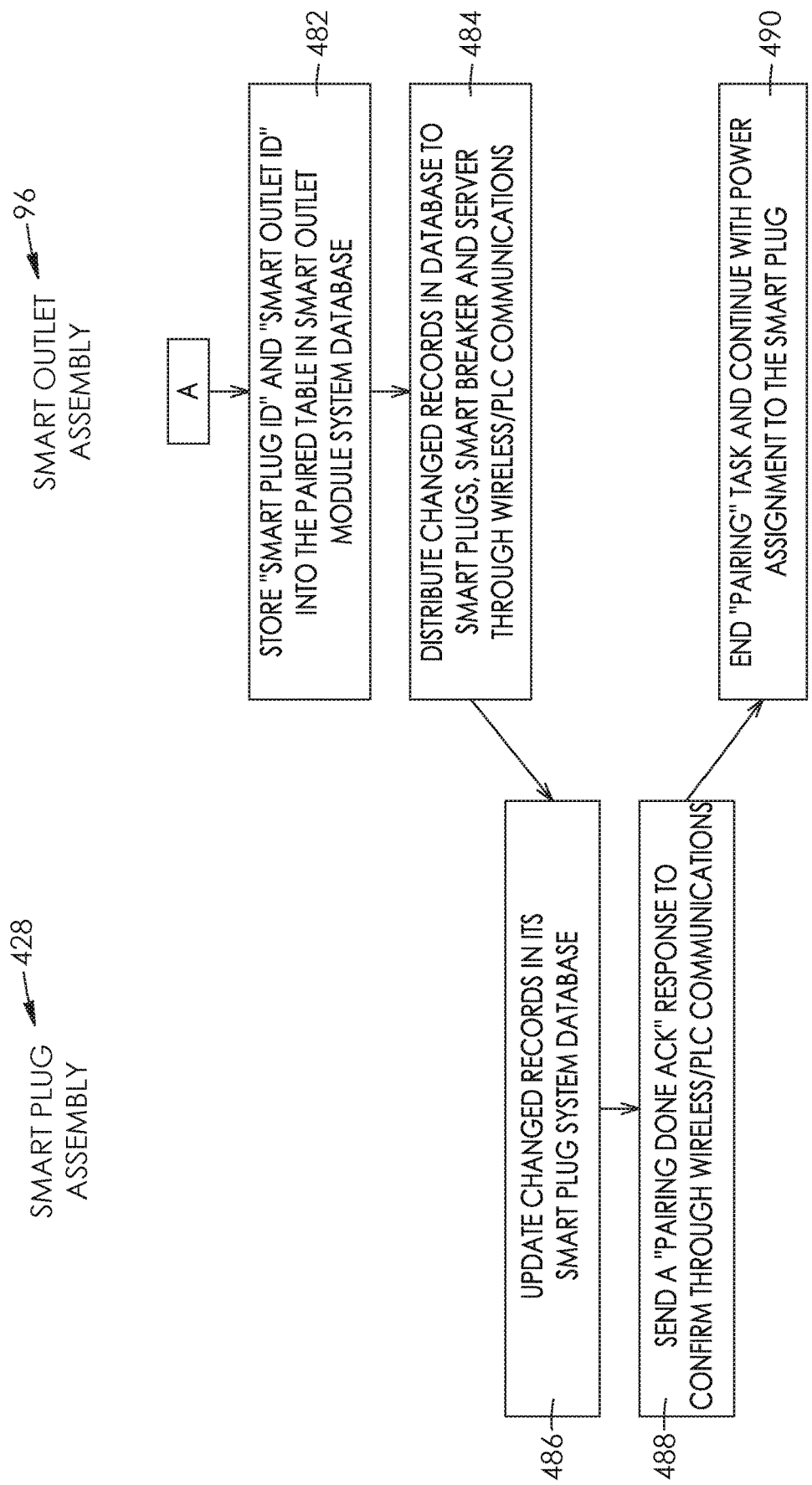

FIGS. 19A and 19B illustrate a pairing mechanism to link up smart plug assembly 428 and smart outlet assembly 96. When the smart plug assembly is inserted into the smart outlet assembly, as shown by box 462, a sensor of the smart plug assembly 428, such as a loop sensor and/or optional sensors such as motion sensor, touch sensor or temperature sensor, for example, detects a status change and wakes up the processor of the smart plug assembly. This is shown by box 464.

As seen in FIG. 17, each smart plug assembly 428 includes a smart outlet pairing button or switch 465. Referring to FIG. 19A, after a user presses or actuates this switch, as shown by box 466, the pairing process begins. The actuation of the switch causes the smart plug assembly 428 to convey a pairing command signal together with its smart plug identification or I to the smart outlet assembly 96 to request pairing, which occurs via wireless or power line communication. This step is shown by box 468.

The smart outlet assembly 96 is configured in response to send a pairing acknowledgement signal to the smart plug assembly that is requesting the pairing, as shown by box 470. The smart outlet assembly is configured to also store the smart plug ID in its smart outlet module system database, as shown by box 472. In the meantime, the smart plug assembly 428 awaits a scanning signal on its power lines and a detection of a closed loop current, as shown by box 473. As shown by box 474, the smart outlet assembly 96 is configured to next connect said scanning signal to each unpaired outlet one by one using a relay on power lines. Once the loop current sensor of the pairing smart plug assembly 428 detects the closed loop current, it sends a request for an outlet ID command signal to the smart outlet assembly 96 to complete the pairing process. This is generally shown by box 476.

As seen by box 478, the smart outlet assembly is configured to respond to the same by conveying an outlet ID acknowledgement signal to the smart plug assembly 428. Meanwhile, the smart plug assembly 428 awaits a signal for updated records in its smart plug system database, as shown by box 480.

Referring to FIG. 19B, the smart outlet assembly 96 obtains both the smart plug ID and the smart outlet ID information and updates a new record in the paired table of its systems database, as shown by box 482. The smart outlet assembly thus determines that the smart plug is connected thereto upon both detecting said current and the replying signal matching a set criteria of the smart outlet assembly.

The smart outlet assembly 96 is configured to thereafter convey or distribute the changed records in its system database to related smart plug assemblies, smart breaker assemblies, modules and servers, in its branch and sub-branches through wireless or power line communications. The smart plug assembly 428 receives the new records from the smart outlet assembly 96 and updates its systems database as well, as shown by box 486.

Upon completing its database records update and as shown by box 488, the smart plug assembly is configured to convey a pairing done acknowledgement signal to the smart outlet assembly 96. The smart outlet assembly is thereafter configured to end the pairing process and continue the process of power assignment as previously discussed above and shown by box 490. The system 40 may thus thereafter automatically assign power to the appliance based on the data records.

Figure 20A:
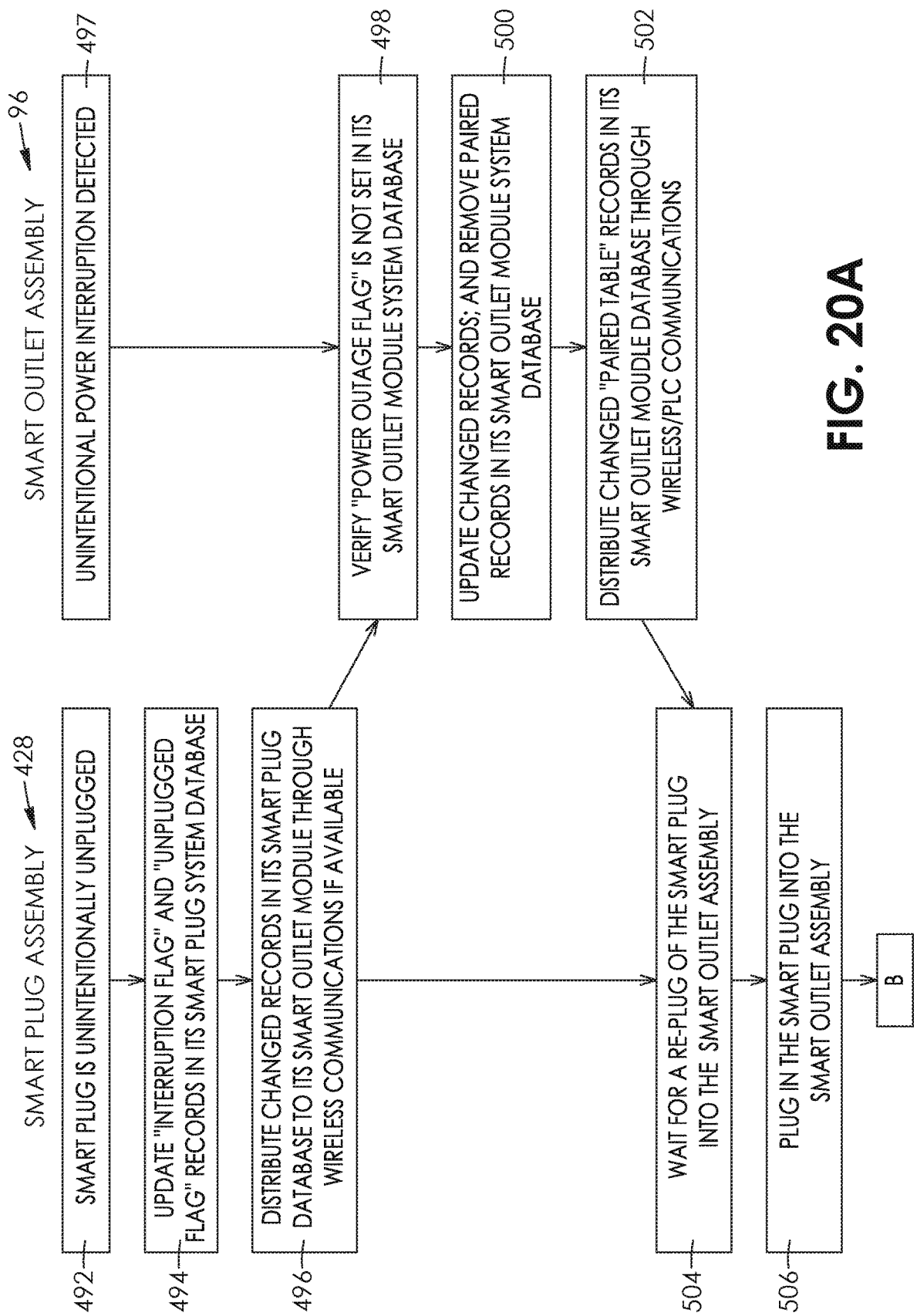
FIGS. 20A and 20B are schematic views of the pairing mechanism and method for re-linking the smart plug assembly of FIGS. 17 and 18A to 18B with one of the smart outlet assemblies of FIG. 1 after the smart plug assembly is unintentionally unplugged from its paired smart outlet assembly.
Figure 20B:
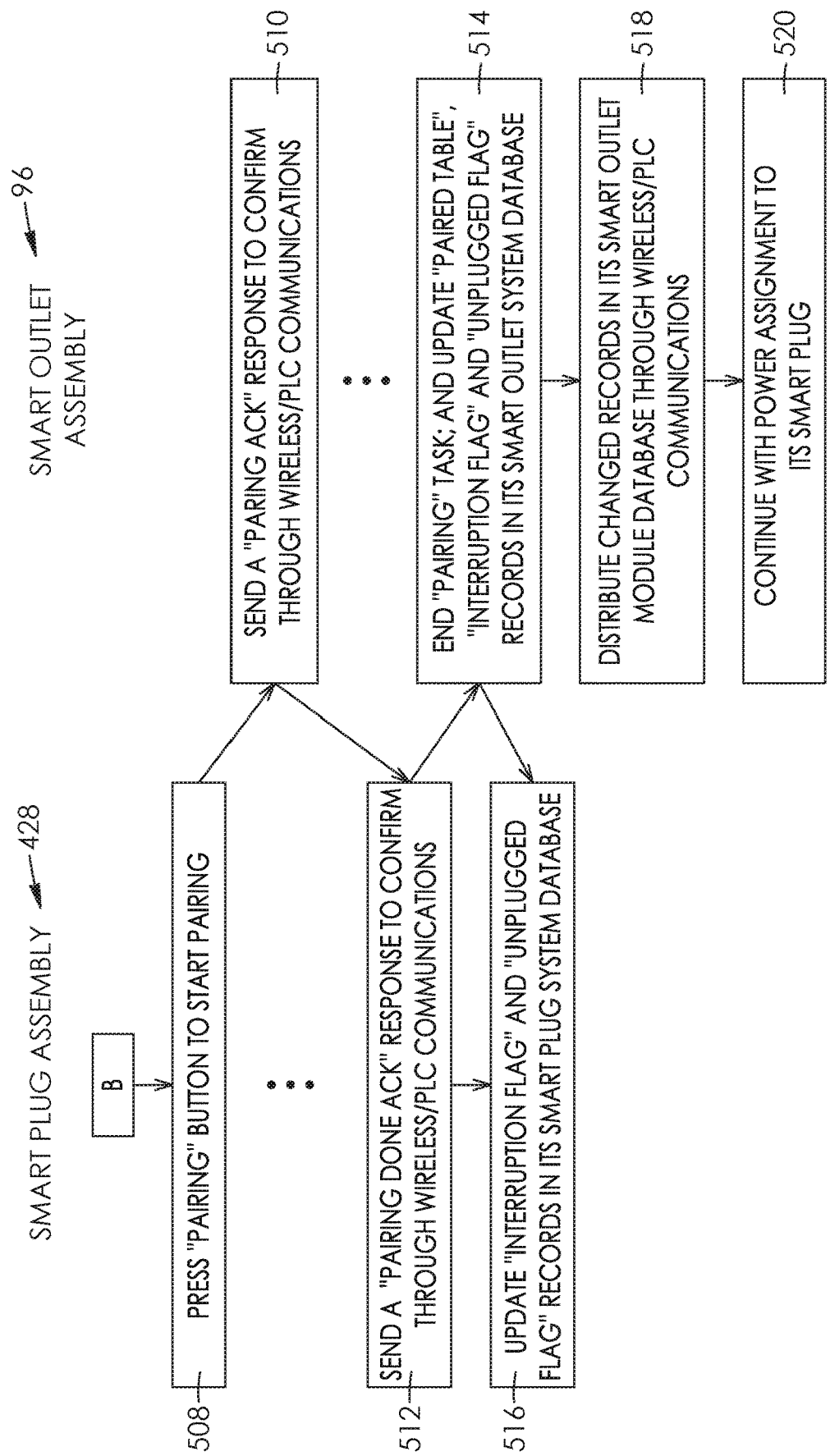

When a smart plug assembly 428 is unplugged either intentionally or unintentionally, the power assignment process terminates and pairing between the smart plug assembly and smart outlet assembly is re-established, as well as power assignment is re-established. FIGS. 20A and 20B illustrate the procedures to re-establish the pairing between a smart plug assembly 428 and its smart outlet assembly 96 after the smart plug assembly is unintentionally unplugged from its paired smart outlet assembly. When a smart plug assembly is unintentionally unplugged from its paired smart outlet assembly, such as when a smart plug assembly is pulled out of its pair smart outlet assembly, the smart plug assembly detects no voltage across its power lines and is configured to conclude that the power up status is interrupted. This is shown by box 492.

The smart plug assembly 428 is configured to update its interruption flag and unplug flag records in its database record, as shown by box 494. This changed set of records is thereafter conveyed or distributed via wireless communication if available to the smart outlet assembly 96 and other management devices in its branch and sub-branches, as shown by box 496. If wireless communication is not available, the smart outlet assembly 96 detects the loop open state of the power lines by voltage/current sensors and power line communication loss to confirm power interruption, as shown by box 497 in FIG. 20A.

After the smart outlet assembly 96 receives or determines the changed set of records and as shown in box 498, the smart outlet assembly is programmed to conclude that the interruption is caused by an unplugging action if the power outage flag is not set in a database record. The smart outlet assembly is configured to thereafter remove the pairing between smart plug assembly 428 and its paired smart outlet assembly from the paired table in its system database, as shown by box 500, and then convey or distribute the latest records to related management devices in its branches and sub-branches, as shown by box 502.

As shown by box 504, the smart plug assembly 428 next waits for a user to re-plug the smart plug assembly into the smart outlet assembly 96. Once the smart plug assembly is re-plugged into the previous or a new smart outlet assembly as shown by box 506, the user next re-presses or actuates the pairing button to restart the process, as shown by box 508 in FIG. 20B. Still referring to FIG. 20B, a pairing acknowledgement signal 510 is sent by the smart outlet assembly 96 to the smart plug assembly 428. The pairing procedure occurs as before and described in FIGS. 19A and 19B, with the smart plug assembly conveying a pairing done acknowledgement signal 512 through wireless or power line communication to the smart outlet assembly when the process is complete. As shown by box 514, the smart outlet assembly 96 in response thereto ends the pairing task, updates the paired table, interruption flag and unplugged flag records in its smart outlet system database. The smart outlet assembly is configured to next distribute the updated records to the smart plug assembly 428 as shown by box 516, distribute the updated records to the management devices in its branches and sub-branches as shown by box 518, and continue with the power assignment as shown by box 520.

Figure 21:
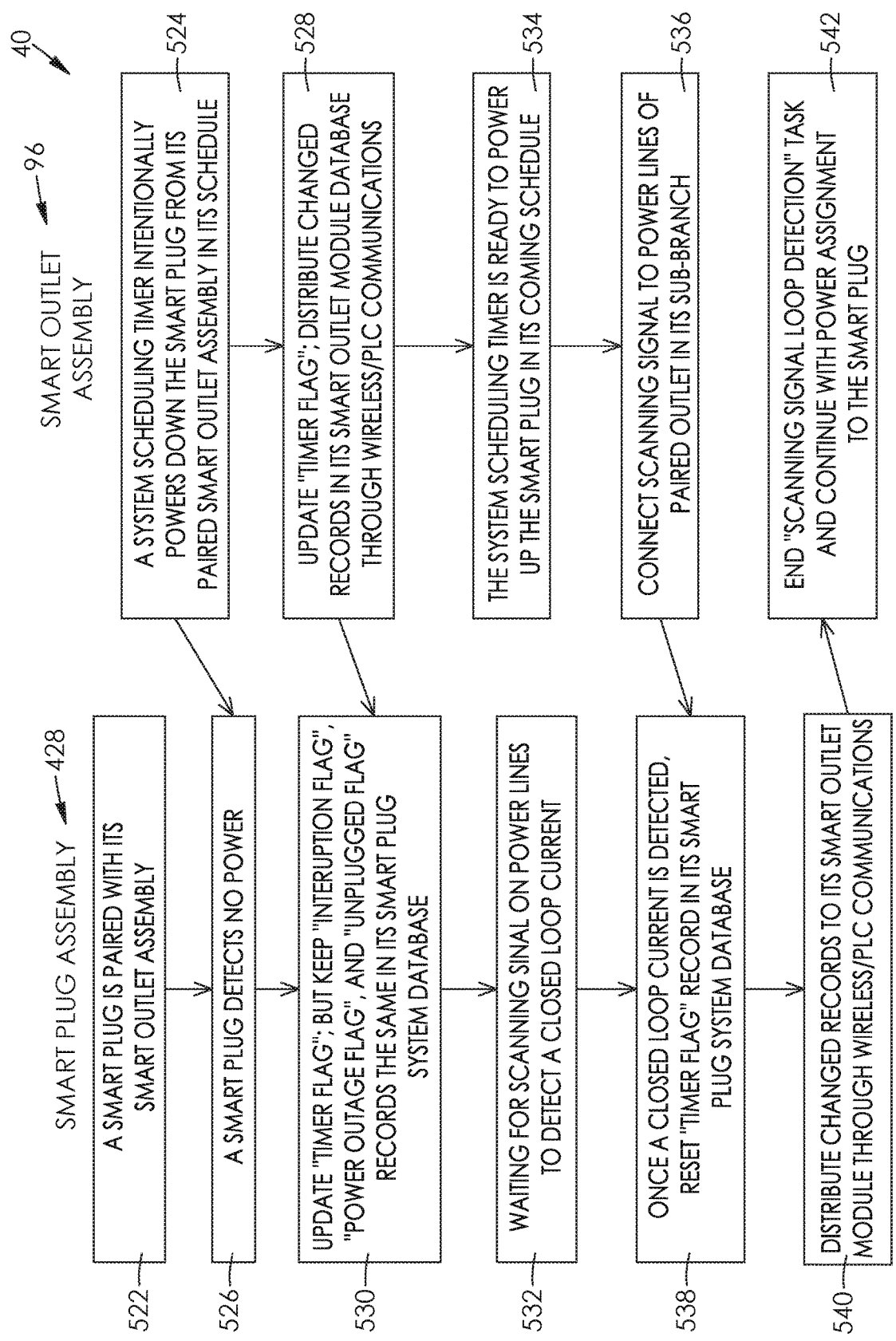
FIG. 21 is a schematic view of a method and procedure to re-power up the smart plug assembly of FIGS. 17 and 18A to 18B from one of the smart outlet assemblies of FIG. 1 after a power down event.

When a smart plug assembly 428 is intentionally powered down, such as by way of a system timer, no re-established pairing between the smart plug assembly and smart outlet assembly 96 is required. However, re-confirmation of secured attachment of the smart plug assembly to its paired smart outlet assembly is necessary for safety reasons. FIG. 21 illustrates the procedure to re-power a smart plug assembly 428 to its paired smart outlet assembly 96 after the smart plug assembly is intentionally powered down. Box 522 shows that the smart plug assembly 428 and smart outlet assembly 96 are initially paired together.

After the outlet power is disconnected by a scheduling timer in the smart outlet assembly and as shown by box 524, the smart plug assembly detects no power as shown by box 526. The timer of the smart outlet assembly 96 is configured to schedule the next outlet power connection, updating the timer flag in the system database records, distributing the changed records to the management devices in its branch and sub-branches via wireless or power line communications, as shown by box 528. The smart plug assembly 428 receives the updated timer flag record but keeps the interruption flag, power outage flag and unplugged flag records the same in its smart plug system database, as shown by box 530. The smart outlet plug assembly is configured to thereafter wait for a scanning signal on its power lines to detect a closed loop current, as shown by box 532.

When the system is ready to power up the next scheduled time and as shown by box 534, the smart outlet assembly 96 is configured to verify the plug-in status of the smart plug assembly 428 by sending a signal for a closed loop current detection, as shown by box 536. Once the smart plug assembly 428 detects a loop current, the smart plug assembly resets its timer flag record in its smart plug system database as shown by box 538. The smart plug assembly thereafter is configured to convey or distribute its changed records to its smart outlet assembly 96 through wireless or power line communication, as shown by box 540.

Once the smart plug assembly 428 responds to the smart outlet assembly 96, the smart outlet assembly is configured to conclude that the smart plug assembly is still attached to the smart outlet assembly. The smart outlet assembly thus ends its scanning loop current detection signal upon receiving the changed records signal from the smart plug assembly, thereafter continues to re-apply power to the smart plug assembly as scheduled and continues the previous power assignment until it is expired. This is shown by box 542.

The system 40 is capable of determining the plug-in condition of a smart plug assembly to a smart outlet assembly even with wireless communication after pairing up between the smart plug assembly and the smart outlet assembly is complete. The system 40 also has the capability of detecting system faults and unauthorized plug-ins during pairing process.

Figure 22:
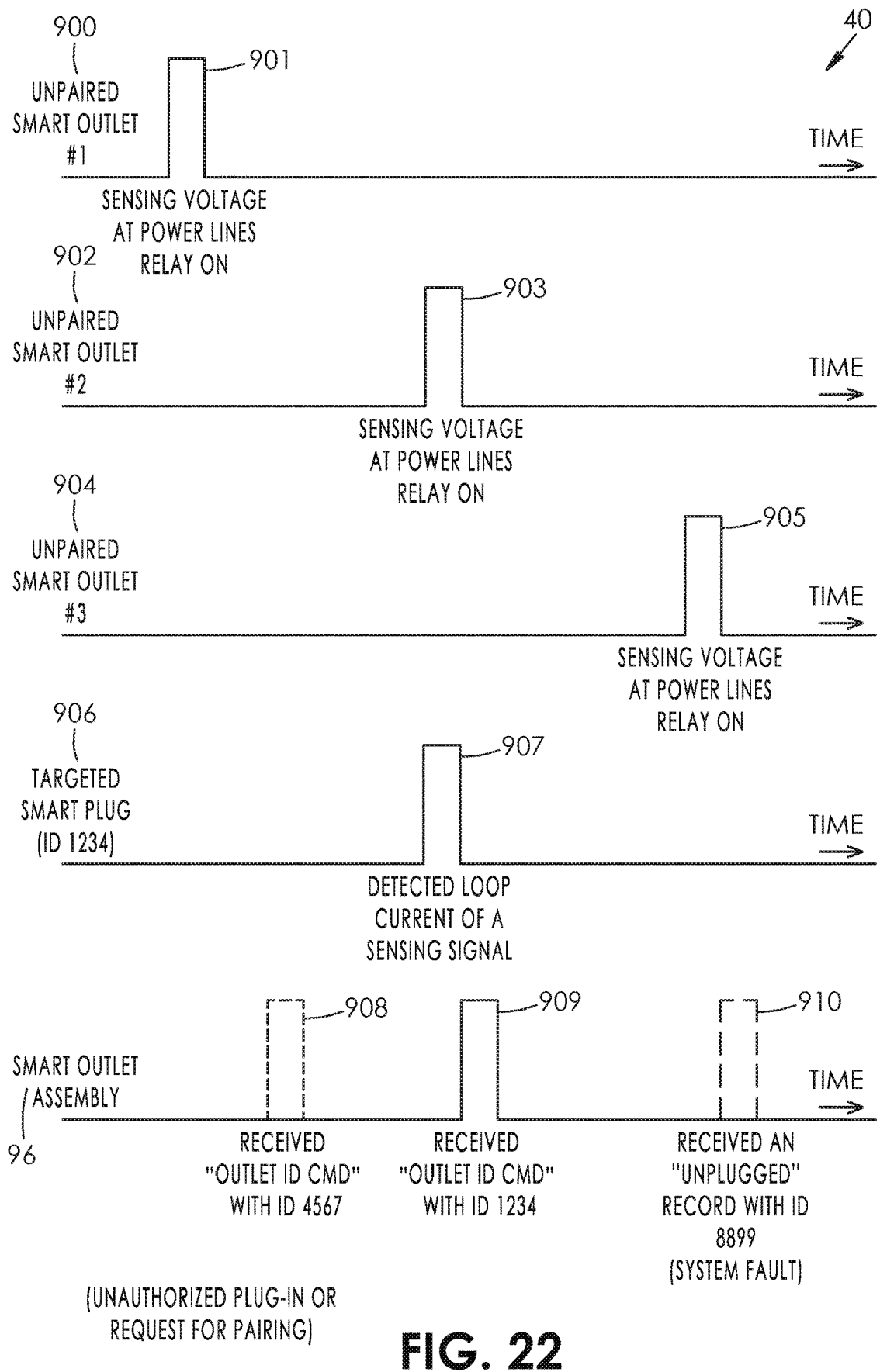
FIG. 22 is a schematic view of the capacity of the system of FIG. 1 to detect system faults and an unauthorized plug-in or pairing request.

FIG. 22 illustrates the capacity of the system 40 to detect system faults and an unauthorized plug-in or pairing request. After a smart plug assembly 906 is plugged into one of the unpaired smart outlets 900, 902, 904 of the smart outlet modules 234a, 234b, 234d of the smart outlet assembly 96 in FIG. 5, the smart plug assembly sends a pairing request together with its ID 1234 by pressing a button or via a sensor, such as touch or motion sensor for example. Once the smart outlet assembly 96 receives the pairing request, it saves the received ID 1234 into its database and then it applies sensing voltage pulses 901, 903, 905 to unpaired outlets 900, 902 and 904 sequentially. When the targeted smart plug assembly 906 detects the loop current pulse 907, the smart plug assembly 906 with ID 1234 sends a "OUTLET ID CMD" 909 to the smart outlet assembly 96. The smart outlet assembly 96 matches the ID 1234 received lately with the "OUTLET ID CMD" 909 and the ID 1234 received with the pairing request before the loop current scanning.

When an intruder sends a "OUTLET ID CMD" with ID 4567 during the loop current scanning on the unpaired outlet #1 (900), the smart outlet assembly 96 receives the "OUTLET ID CMD" but rejects the pairing because of the mismatched IDs. The smart outlet assembly 96 is capable detecting if the smart plug assembly with ID 4567 is physically plugged into the outlet #1 (900) through the loop sensing.

When the smart outlet assembly receives an "UNPLUGGED" record 910 with ID 8899 involving the unpaired outlet #3 (904) due to a system fault, the system 40 is capable to remove the invalid pairing record since the outlet #3 has not been paired up. If the smart plug with ID 8899 is paired up with the smart outlet of the smart outlet module (234c) and the "UNPLUGGED" record 910 is valid, the smart plug with ID 8899 must repeat the pairing process to eliminate the system fault when it is re-plugged into its paired outlet as described in the boxes 508, 510, 512 in FIG. 20B.

Smart appliances, smart outlet assemblies, smart breaker assemblies and the like as herein described may be referred to smart devices. Smart devices are electrical devices that may connect to other networks or devices via different communication protocols.

The terms "wired" and "wireless" may be substituted for each other in various places throughout the description of the systems as herein described.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. A power assignment system for selectively providing power to a plurality of appliances, each of the appliances having a memory and containing a database of manufacturer-provided and user-provided data records stored in the memory thereof, the system comprising:
    a plurality of electrical circuits, each said circuit including a smart breaker assembly connectable to an electrical power source, each said smart breaker assembly having a memory, and each said circuit including branches and sub-branches, the appliances coupling to respective ones of said sub-branches;
    a plurality of smart outlet assemblies for each said circuit, the smart outlet assemblies coupling to and exchanging database records with paired ones of the appliances, each said smart outlet assembly having a memory and including stored in said memory thereof a collection of database records of the appliances that are connected, authorized to connect and pending to connect to said each smart outlet assembly, each of the smart outlet assemblies coupling to and exchanging database records with their corresponding said smart breaker assembly, each said smart breaker assembly including stored in the memory thereof a collection of database records of the database records stored in their said smart outlet assemblies; and
    a master server in communication and exchanging database records with each said smart breaker assembly, the master server managing power assignments and re-assignments for said circuits including said sub-branches based on said manufacturer-provided data records and said user-provided data records so distributed.

2. The system as claimed in claim 1, wherein the distributed said database records are used by the smart outlet assemblies and each said smart breaker assembly to implement power sharing.

3. The system as claimed in claim 1, wherein the distributed said database records are used by the master server to implement power assignments to the smart outlet assemblies.

4. The system as claimed in claim 1, wherein the distributed said database records are used by the master server to implement power re-assignments to the smart outlet assemblies, the power re-assignments comprising a change of demand after the power assignment is completed or interrupted, with the power re-assignments being driven to ensure safe operation of the system.

5. The system as claimed in claim 1, wherein the system further includes power line communication transceivers for enabling inter-branch power line communication between different said branches or between one said branch and a multi-branch server, the power line communication transceivers enabling communications on said sub-branches between said appliances and said smart outlet assemblies.

6. The system as claimed in claim 1, further including smart plug assemblies and at least one of a wireless communication system and a wired communication system for establishing communication between the smart outlet assemblies and the smart plug assemblies.

7. The system as claimed in claim 1, wherein the data and communication channels of the system are configured to be encrypted.

8. The system as claimed in claim 1, wherein the master server is configured to provide the power assignments and the power re-assignments based on the distributed said database records and dynamic changes to the system for power sharing, system management, and home automation.

9. The system as claimed in claim 1 wherein the master server is configured to implement power sharing between the smart outlet assemblies based on the power assignments and the power re-assignments in response to changing of the loading of the power line conductors in terms of current in branches or sub-branches of the system.

10. The system as claimed in claim 1, wherein cable size and ampacity of conductors are included in the distributed said database records, with the system limiting a branch current to a value less than a rated ampacity thereof and the master server allowing another said branch of the system to share any remaining power.

11. The system as claimed in claim 1, wherein the master server, the smart breaker assembly and the smart outlet assemblies are arranged in a star topology to manage branch and sub-branch communication and a power sharing scheme.

12. The system as claimed in claim 1, wherein each said smart breaker assembly includes a power line overcurrent protection device, one or more sensors, at least one digital signal processor, at least one controller, and at least one of a multi-channel power line communication transceiver and a wireless communication transceiver with channel encryption for system security.

13. The system as claimed in claim 1, wherein each said smart outlet assembly includes one or more smart outlet modules, a sub-branch communication module and at least one of a power line communication module and a wireless communication module.

14. The system as claimed in claim 13 wherein each said power line communication module of the smart outlet assemblies comprises a module processor, a controller, a memory storing a sub-branch database, a multi-channel inter-module communication transceiver and at least one of a multi-channel power line communication transceiver and a wireless communication transceiver.

15. The system as claimed in claim 13, wherein each said smart outlet module includes a power line overcurrent protection device, a multi-channel inter-module communication transceiver configured to be encrypted, one or more sensors, a memory storing a smart outlet management database, a power sharing and controls manager, a digital signal processor and a controller.

16. The system as claimed in claim 1 wherein the system is configured to include a redundancy of database records distributed in the system such that during system failures where one or more local said branches or sub-branches are isolated by disconnection with said master server or said smart breaker assembly, said redundancy ensures safe operation of the one or more isolated said branches or sub-branches.

17. The system as claimed in claim 1, wherein if the master server is unreachable, each said smart breaker assembly is configured to manage power assignments and re-assignments for its said circuit based on said manufacturer-provided data records and said user-provided data records so distributed.

18. The system as claimed in claim 1 wherein when one said appliance is coupled to one said smart outlet assembly, a set of user-provided and manufacturer-provided data records of the one said appliance is conveyed from the one said appliance to the one said smart outlet assembly, conveyed from the one said smart outlet assembly to a corresponding said smart breaker assembly, and conveyed from the corresponding said smart breaker assembly to the master server, and if the set of user-provided and manufacturer-provided data records is determined to be legitimate by the one smart outlet assembly, the corresponding said smart breaker assembly and the master server, respectively, only then is power provided to the one said smart outlet assembly to power the one said appliance.

19. The system as claimed in claim 1 wherein when one said appliance is coupled to one said smart outlet assembly, power is provided to the one said smart outlet assembly only upon a set of user-provided and manufacturer provided data records of the one said appliance being communicated to one or more of the one said smart outlet assembly, a corresponding said smart breaker assembly and the master server and being determined to be legitimate by one or more of the one said smart outlet assembly, the corresponding said smart breaker assembly and the master server.

20. The system as claimed in claim 1, wherein the power assignments specify one or more of an amount of power, a duration of power provided and connecting conditions allocated to a load or to a given said appliance at the start of the connection thereof.

21. The system as claimed in claim 1, wherein the power assignments specify an amount of power, a duration of power provided and connecting conditions allocated to a load or to a given said appliance at the start of the connection thereof.

22. The system as claimed in claim 1, wherein the system includes an inter-module communication assembly which is wired and configured to link up processors of the smart outlet assemblies for power management.

23. A power assignment system for selectively providing power to a plurality of appliances, each of the appliances having a memory and containing a database of manufacturer-provided and user-provided data records stored in the memory thereof, the system comprising:
   a smart breaker assembly connectable to an electrical power source, the smart breaker assembly having a memory;
   a plurality of smart outlet assemblies coupled to the smart breaker assembly via branches of respective circuits, the smart outlet assemblies coupling to and exchanging database records with paired ones of the appliances via sub-branches of the respective said circuits, each said smart outlet assembly having a memory and including stored in said memory thereof a collection of database records of the appliances that are connected, authorized to connect and pending to connect to said each smart outlet assembly, each of the smart outlet assemblies coupling to and exchanging database records with the smart breaker assembly, with said smart breaker assembly including stored in the memory thereof a collection of database records of the database records stored in said smart outlet assemblies; and
   a master server in communication and exchanging database records with the smart breaker assembly, the master server managing power assignments and re-assignments for said circuits including said sub-branches based on said manufacturer-provided data records and said user-provided data records so distributed.

\* \* \* \* \*

UNITED STATES PATENT AND TRADEMARK OFFICE
CERTIFICATE OF CORRECTION

| | |
|---|---|
| PATENT NO. | : 11,462,910 B2 |
| APPLICATION NO. | : 16/647504 |
| DATED | : October 4, 2022 |
| INVENTOR(S) | : Cheuk Kwan Lui |

It is certified that error appears in the above-identified patent and that said Letters Patent is hereby corrected as shown below:

In the Claims

Column 22, Line 16, should read:
9. The system as claimed in claim 1 wherein the master server is configured to implement power sharing between the smart outlet assemblies based on the power assignments and the power re-assignments in response to changing of the loading of power line conductors in terms of current in said branches or said sub-branches of the system.

Signed and Sealed this
Twentieth Day of December, 2022

Katherine Kelly Vidal
*Director of the United States Patent and Trademark Office*